(12) United States Patent
Yamamoto et al.

(10) Patent No.: US 6,307,940 B1
(45) Date of Patent: Oct. 23, 2001

(54) COMMUNICATION NETWORK FOR ENCRYPTING/DECIPHERING COMMUNICATION TEXT WHILE UPDATING ENCRYPTION KEY, A COMMUNICATION TERMINAL THEREOF, AND A COMMUNICATION METHOD THEREOF

(75) Inventors: Takahisa Yamamoto, Kawasaki; Keiichi Iwamura, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,279

(22) Filed: Jun. 25, 1998

(30) Foreign Application Priority Data

Jun. 25, 1997 (JP) .................................... 9-168706
Jul. 2, 1997 (JP) .................................... 9-177273

(51) Int. Cl.[7] ........................................ H04L 9/00
(52) U.S. Cl. .............................. 380/277; 380/44; 380/45
(58) Field of Search ............................ 380/277, 45, 44

(56) References Cited

U.S. PATENT DOCUMENTS

| | | | |
|---|---|---|---|
| 5,412,730 | * 5/1995 | Jones | 380/21 |
| 5,828,752 | 10/1998 | Iwamura et al. | 380/46 |
| 5,966,449 | 10/1999 | Iwamura et al. | 380/21 |

OTHER PUBLICATIONS

Bruce Schneier, Applied Cryptology, chapter 16, Oct. 1995.*
"Theory and Applications of Trapdoor Functions" (Proceedings of the 23$^{rd}$ IEEE Symposium on Foundations of Computer Science, IEEE, pp. 80–91, 1982).

* cited by examiner

Primary Examiner—Gail Hayes
Assistant Examiner—James Seal
(74) Attorney, Agent, or Firm—Fitzpatrick, Cella, Harper & Scinto

(57) ABSTRACT

In a cryptosystem which performs encryption/deciphering of communication text using k bits of cryptographically secure pseudo-random numbers as the block cipher key thereof, the block cipher key is updated each time j=k/m bits of new pseudo-random numbers are generated, with the j·m=k bits of pseudo-random numbers created by combining the j·(m−1) bits within the k bits of the present key and the newly generated j bits, serving as a new key, thereby shortening the updating cycle and improving the safety. Also, by sending the number of times of generation of pseudo-random numbers along with the encrypted communication text from the sending side, and by the receiving side using from the sequentially generated pseudo-random numbers, pseudo-random numbers generated after the received number of times of generation as the new key, deciphering can be performed regardless of the order to reception, in the event that a plurality of cipher texts are sequentially sent while updating the encryption key.

19 Claims, 23 Drawing Sheets

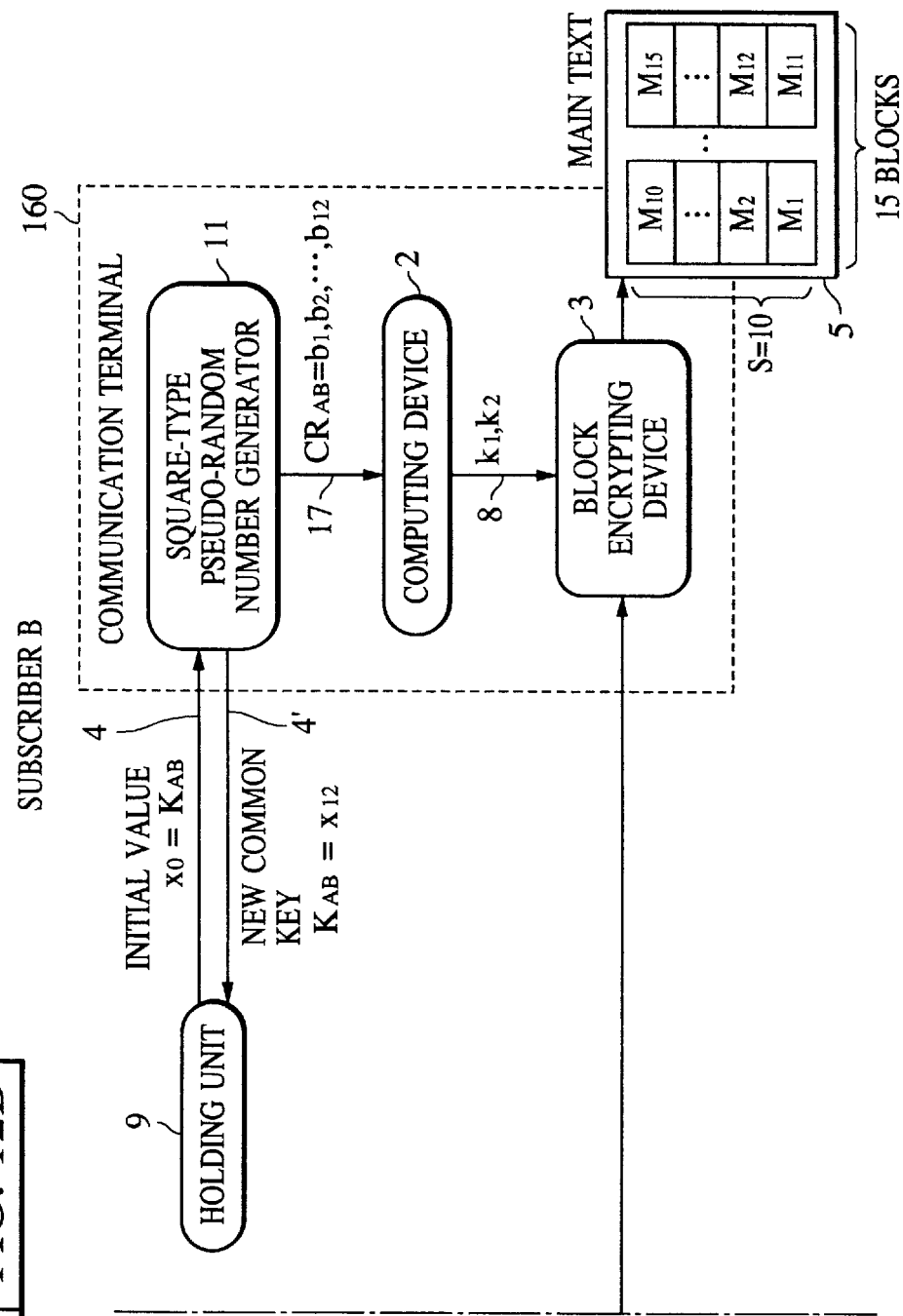

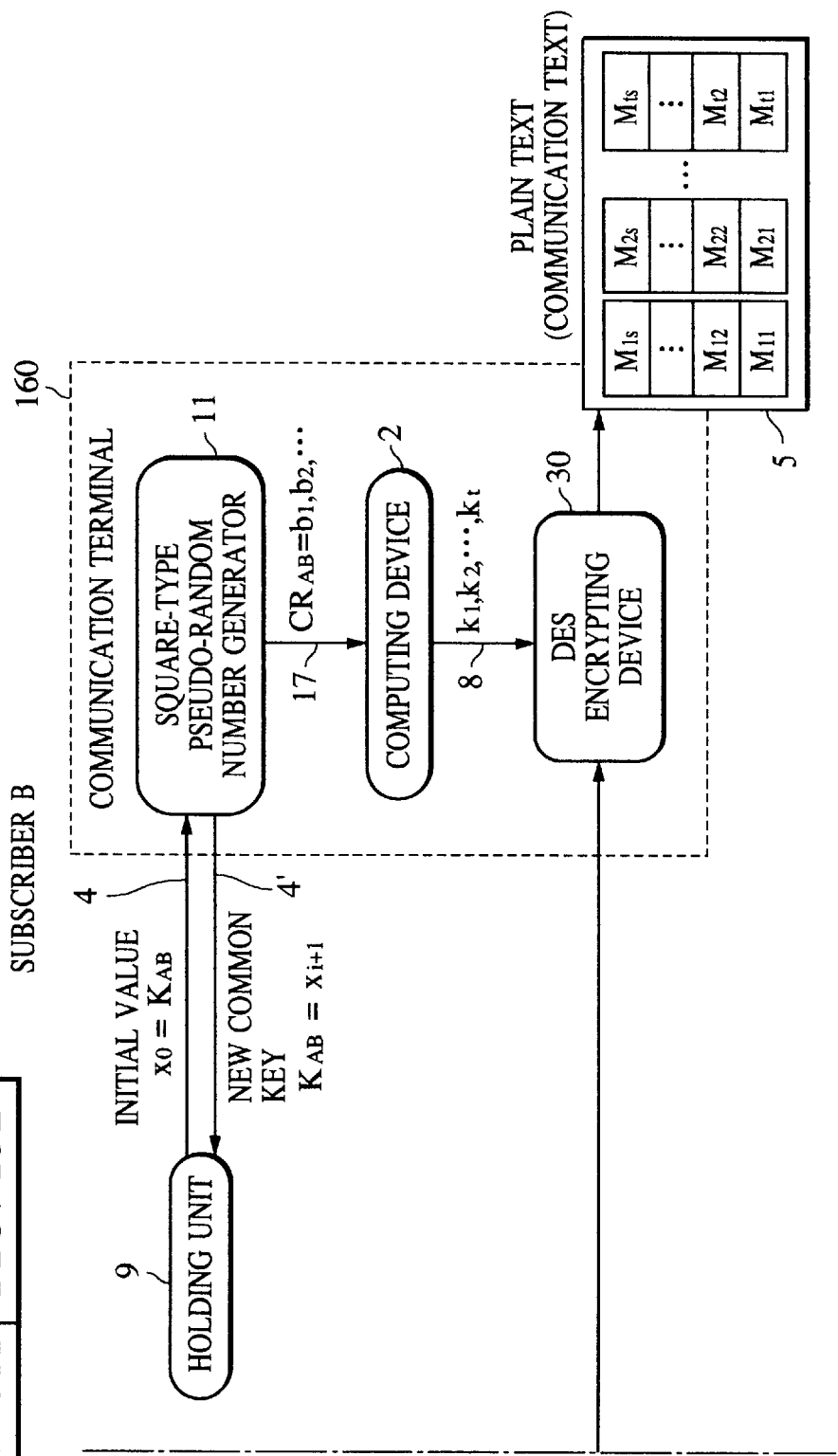

COMMUNICATION NETWORK FOR ENCRYPTING/DECIPHERING COMMUNICATION TEXT WHILE UPDATING ENCRYPTION KEY, A COMMUNICATION TERMINAL THEREOF, AND A COMMUNICATION METHOD THEREOF

BACKGROUND OF THE INVENTION

1. Field of the Invention

The preset invention relates to a communication network and a method thereof for realizing secrecy of data in the field of communication, in which the encryption key is changed each time communication is made, even if the other party with which communication is being made is the same party each time. More particularly, the preset invention relates to a cryptosystem for an open-algorithm common key block cipher, in which the encryption key for the block cipher is sequentially updated in order to improve safety, and to a method for updating the key for the cryptosystem.

2. Description of the Related Art

Open-algorithm common key block ciphers such as represented by the DES (Data Encryption Standard) and FEAL (Fast data Encipherment Algorithm) are defective in that the key can be analyzed in the event that a certain number or more of sets of cipher text encrypted by the key and plain text are output.

In order to deal with this defect, U.S. Pat. No. 5,600,720 (hereafter referred to as "Reference 1") proposes a cryptosystem in which the key for block cipher is periodically updated by cryptographically secure pseudo-random numbers, in which, as shown in FIG. 22, the key is updated by cryptographically secure pseudo-random numbers before outputting the number of sets of cipher text and plain text needed to analyze the key so as to complicate the difficulty in analyzing the key, thereby improving the safety of the open-algorithm common key block cipher. It must be noted here that the term "cryptographically secure pseudo-random number" refers to a pseudo-random number which is indistinguishable from a true random number by a logic circuit of a polynomial order.

In other words, a cryptographically secure pseudo-random number sequence is a number sequence in which it is extremely difficult to predict a subsequent sequence from an output sequence. Such is discussed in detail in, e.g., A. C. Yao: "Theory and Applications of Trapdoor Functions" (Proceedings of the 23rd IEEE Symposium on Foundations of Computer Science, IEEE, pp. 80–91, 1982), (hereafter referred to as "Reference 2"), and M. Blum and S. Micali: "How to Generate Cryptographically Strong Sequences of Pseudo-Random Bits" (Proc. 22nd FOCS, IEEE, pp. 112–118, 1982), (hereafter referred to as "Reference 3").

Known algorithms for generating such cryptographically secure pseudo-random numbers include such using square-type random numbers, RSA cipher, discreet logarithms, and inverse number cipher.

The cryptosystem shown in FIG. 22 is comprised of a pseudo-random number generator 1, a computing device 2, and a block encrypting device 3. The pseudo-random number generator 1 generates pseudo-random numbers following a cryptographically secure pseudo-random number algorithm. DES cipher or FEAL cipher is used as the block cipher for the algorithm for the block encrypting device 3. The key stream necessary for periodical updating of the block cipher key is obtained by dividing the cryptographically secure pseudo-random number series output from the computing device 2 into bit-lengths of the block cipher key. The block cipher key is updated by means of sequentially using the key stream k1, k2, . . . , as the block cipher key. The block encrypting device 3 performs encrypting of the plain text block stream 5 (communication text: $M_{11}$ to $M_{1s}$, $M_{21}$ to $M_{2s}$, . . . , $M_{t1}$ to $M_{ts}$) into the cipher block stream 6 ($k_1(M_{11})$) to $k_1(M_{1s})$, $k_2(M_{21})$ to $k_2(M_{2s})$, . . . , $k_t(M_{t1})$ to $k_t(M_{ts})$), and deciphering of the cipher text.

The pseudo-random number generator 1 which generates cryptographically secure pseudo-random numbers due to algorithms using square-type random numbers, RSA cipher, discreet logarithms, and inverse number cipher, is configured as shown in FIG. 23. The operation thereof is as shown below:

(1) $x_0 = K_{AB}$ is input into the pseudo-random number generator 1 as the initial value 4.

(2) $x_1, x_2, \ldots$, is generated by feedback calculation $x_{i+1} = f(x_i)$ (i=0, 1, . . . ) in the first computing unit 101.

(3) In the second computing unit 102, calculation $b_{i+1} = g(x_{i+1})$ (i=0, 1, . . . ) is performed from the generated $x_1, x_2, \ldots$, and the obtained $b_1, b_2, \ldots, b_m$ is output as pseudo-random number 7 ($CR_{AB}$).

In the above procedures, $x_{i+1}$ which is periodically updated by feedback calculation is referred to as an internal variable within the pseudo-random number generator 1. Also, the procedures necessary to generate a pseudo-random number $b_1$ obtained at one time is referred to as one step.

Further, the computing device 2 converts the output $CR_{AB}$ obtained from the pseudo-random number generator 1 into the block cipher key stream $k_1, k_2, \ldots, k_t$. Each of the keys $k_u$ (u=1, 2, . . . , t) of the block cipher are bit streams of a certain length which is determined by the algorithm of the block cipher used, and are generated by the computing device 2 dividing the cryptographically secure pseudo-random number stream $CR_{AB}$ in the determined bit lengths.

In FIG. 22, $M_{uv}$ (u=1, 2, . . . , t:v=1, 2, . . . , s) represents plain text block 5, $k_u$ (u=1, 2, . . . , t) represents the key stream 8 of the block cipher, $k_u(M_{uv})$ (u=1, 2, . . . , t:v=1, 2, . . . , s) represents the cipher text block stream 6 obtained by encrypting the plain text $M_{uv}$ with the encryption key $k_u$. Here, the number s blocks from $M_{u1}$ to $M_{us}$ is encrypted using the same key $k_u$. The plain text block 5 shown in FIG. 22 is encrypted by a plurality of encrypting keys by means of sequentially using the aforementioned pseudo-random number stream as the block cipher key.

According to this cryptosystem, the number of plain text block encrypted by the same key is s, so analyzing of the key can be made difficult in the event that the number of sets of plain text blocks and cipher text blocks necessary for analysis of the key exceeds the number s.

In other words, the shorter the cycle for updating the block cipher key is, the further the number of pieces of plain text encrypted with the same key is reduced, thereby improving the safety thereof.

However, with the arrangement described in Reference 1, the aforementioned cryptographically secure pseudo-random number stream 7 ($CR_{AB}$) is divided into bit lengths of the block cipher key and used sequentially as the block cipher key, so once a key is updated, updating to the next key cannot be made until pseudo-random numbers in bit lengths of the block cipher key are output anew from the pseudo-random number generator 1.

Now, this will be quantitatively evaluated. The updating cycle of the block cipher key can be calculated as follows.

In the event that cryptographically secure pseudo-random numbers generated at the speed of $w_r$(bps) are used in a situation wherein, as shown in FIG. 24, the bit length of each block to be encrypted at one time is $m_b$(bits), the bit length of the encryption key is $m_k$(bits), and the encryption processing speed is $w_e$(bps), the number of block encryption keys $w_k$ generated per second can be calculated as follows:

$$w_k = w_r/m_k.$$

The number of blocks $w_b$ which can be encrypted per second is:

$$w_b = w_e/m_b,$$

and accordingly, the number of blocks s encrypted with one encryption key is:

$$s = w_b/w_k.$$

The number of plain text blocks s encrypted with the same encryption key can be thus obtained.

For example, let us calculated what s will be under the following <Conditions 1>.
<Conditions 1>
(Block encryption)
  Bit length of blocks encrypted at one time: 64 bits ($m_b=64$)
  Bit length of encryption key: 72 bits ($m_k=72$)
  Encryption processing speed: 128 Mbps ($w_e=128\times10^6$)
  (generation of pseudo-random numbers)
  Number of pseudo-random numbers $b_i$ output at one time: 9 bits
  Processing time per step: $10^{-3}$ seconds Now, the processing time per step refers to the processing time necessary to obtain a single $b_i$. That is, in the case of <Conditions 1>, a 9-bit pseudo-random number can be obtained every $10^{-3}$ seconds. Accordingly, the pseudo-random number generating speed $w_r$ is:

$$w_r = 9 \times 10^3 \text{(bps)}.$$

Calculating the number of block encryption keys $w_k$ generated per second, the following holds.

$$w_k = w_r/m_k = 2^{-3} \times 10^3$$

The number of blocks $w_b$ which can be encrypted per second is:

$$w_b = w_e/m_b = 2 \times 10^6,$$

so the number of blocks s encrypted by one encryption key is:

$$s = w_b/w_k = 2^4 \times 10^3.$$

That is to say, in the event that updating of block encryption keys is performed according to Reference 1 under <Conditions 1>, the key is updated each time $2^4 \times 10^3$ blocks are encrypted.

FIG. 25 schematically shows the processing performed in the case that block cipher key updating is carried out according to Reference 1 under <Conditions 1>. As shown in the Figure, a 9-bit pseudo-random number can be obtained with one step of the pseudo-random number generating device 1, so eight steps are required for generating a 72-bit block cipher key. Hence, the first block cipher key $k_1$ is:

$$k_1 = b_1, b_2, b_3, b_4, b_5, b_6, b_7, b_8,$$

and the first $2^4 \times 10^3$ blocks of the plain text block stream 5 are encrypted with this key.

Further, the next block cipher key $k_2$ is obtained by the subsequent eight steps of the pseudo-random number generating device 1, yielding:

$$k_2 = b_9, b_{10}, b_{11}, b_{12}, b_{13}, b_{14}, b_{15}, b_{16}.$$

The second $2^4 \times 10^3$ blocks of the plain text block stream 5 are encrypted with this key by the block encrypting device 3.

In this case, the computing device 2 gathers the pseudo-random numbers 7 ($b_1, b_2, \ldots, b_8, b_9, b_{10}, \ldots$) input from the pseudo-random number generating device, eight at a time, arrays these sequentially in the order of input, and outputs the result as the block cipher key stream 8 ($k_1, k_2, \ldots$).

As can be seen from the above, in the case of attempting to periodically update the block keys according to the method described in Reference 1 using cryptographically secure pseudo-random numbers, only one key update can be performed each time pseudo-random numbers equal to the bit length of the block cipher key is output from the pseudo-random number generating device 1.

Also, with an encrypted communication network, unique keys are appropriated to all pairs of network subscribers beforehand, and the two subscribers hold the unique key in secret. Sharing of the key can be realized either by the network administrator or the like setting the key, or by a known key sharing method. Further, each subscriber has a communication terminal comprising; an encryption device 3 for performing encryption (deciphering) following an algorithm stipulated on the network, as shown in FIG. 22; a pseudo-random number generator 1 for generating cryptographically secure pseudo-random numbers following an algorithm stipulated on the network; and a computing device 2 for converting the pseudo-random numbers output from the pseudo-random number generator 1 into a key stream.

The encrypted communication from subscriber A to B using this communication terminal is performed according to the following procedures, for example.

(1) The sender A sets the secret key $K_{AB}$ which has been distributed beforehand and is shared with the destination B at the initial value $X_0$ of the pseudo-random number generator 1 and operates the pseudo-random number generator 1, thereby generating cryptographically secure pseudo-random number stream 7 ($CR_{AB}$). Further, the $CR_{AB}$ generated thereby is converted into a block cipher key stream 8 ($k_1, k_2, \ldots, k_t$). These are used while periodically updating as block cipher keys, thereby encrypting the plain text block stream 5 (communication text $M_{uv}$; u=1, 2, \ldots, t:v=1, 2, \ldots, s$) with the block encryption device 3, and the encrypted cipher text block stream 6 ($k_u(M_{uv})$; u=1, 2, \ldots, t:v=1, 2, \ldots, s$) is sent to the destination B.

(2) The destination B sets the secret key $K_{AB}$ which has been distributed beforehand and is shared with the destination A at the initial value $X_0$ of the pseudo-random number generator 1 and operates the pseudo-random number generator 1, thereby generating cryptographically secure pseudo-random number stream 7 ($CR_{AB}$). Further, the $CR_{AB}$ generated thereby is converted into a block cipher key stream 8 ($k_1, k_2, \ldots, k_t$). These are used while periodically updating as block cipher keys, thereby obtaining the received cipher text block stream 6 ($k_u (M_{uv})$; u=1, 2, \ldots, t:v 1, 2, \ldots, s$) sent from the sender A by using the block encryption device 3.

However, according to this method, in the event that communication between the subscribers is ended and then restarted, the initial value of the pseudo-random number generator 1 is reset to the key $K_{AB}$ which has already been used earlier, which is problematic in that secrecy cannot be sufficiently maintained.

Also, there is a known method for using a different cipher key per instance of communication, called a session key, but this session key is discarded each time communication is made, so while generating a session key is simple, the generation thereof has been based on pseudo-random numbers not cryptographically secure.

Also, a method is known in which a new secret key $K'_{AB}$ is communicated at the end of each communication to serve as the next initial value, thereby updating the mutually shared key, but there has been the problem in that the amount of communication increases due to updating the key.

Also, there has been the problem in the event that block cipher keys are to be updated with known methods using cryptographically secure pseudo-random numbers, in that only one key update can be performed each time pseudo-random numbers equal to the bit length of the block cipher key are output.

SUMMARY OF THE INVENTION

Accordingly, it is an object of the present invention to do away with the problems of the above-described known art and to provide a communication network, a communication terminal thereof, and a communication method thereof, in which encrypting/deciphering communication text while updating the encryption key is performed with sufficient secrecy maintained, and without increasing the amount of communication for updating the key.

It is another object of the present invention to shorten the updating cycle of the block encoding key, thereby improving the safety of block encryption.

It is a further object of the present invention to encrypt with a different encryption key each time communication is made, even if the other party with which communication is being made is the same party each time, thereby further complicating the difficulty of cryptoanalysis.

According to one aspect, the present invention which achieves these objects relates to: a communication method for encrypting and transmitting a communication text, said communication method comprising the steps of: a sender sequentially generating pseudo-random numbers based on a common key secretly shared with a receiver; creating a new encryption key each time a first certain amount of pseudo-random numbers are generated, based on this newly-created first certain amount of pseudo-random numbers and a previously-created second certain amount of pseudo-random numbers, and updating the encryption key; and encrypting and transmitting the communication text using the updated encryption key.

According to another aspect, the present invention which achieves these objects relates to: a communication method for receiving and deciphering a communication text, said communication method comprising the steps of: a receiver sequentially generating pseudo-random numbers based on a common key secretly shared with a sender; creating a new encryption key each time a first certain amount of pseudo-random numbers are generated, based on this newly-created first certain amount of pseudo-random numbers and a previously-created second certain amount of pseudo-random numbers, and updating the encryption key; and deciphering the encrypted communication text using the updated encryption key.

According to still another aspect, the present invention which achieves these objects relates to: a communication terminal device, comprising: transmitting means for encrypting and transmitting a communication text using an encryption key: means for a sender generating pseudo-random numbers based on a common key secretly shared with a receiver; means for creating a new encryption key each time a first certain amount of pseudo-random numbers are generated by said pseudo-random numbers generating means, based on this newly-created first certain amount of pseudo-random numbers and a previously-created second certain amount of pseudo-random numbers; and means for updating the encryption key used by said transmitting means each time a new encryption key is created by said means for creating a new encryption key.

According to yet another aspect, the present invention which achieves these objects relates to: a communication terminal device, comprising: receiving means for receiving and deciphering a communication text: means for a receiver generating pseudo-random numbers based on a common key secretly shared with a sender; means for creating a new encryption key each time a first certain amount of pseudo-random numbers are generated by said pseudo-random numbers generating means, based on this newly-created first certain amount of pseudo-random numbers and a previously-created second certain amount of pseudo-random numbers; and means for updating the encryption key used by said transmitting means each time a new encryption key is created by said means for creating a new encryption key.

According to a further aspect, the present invention which achieves these objects relates to: a communication method for encrypting and transmitting a communication text, said communication method comprising the steps of: a sender sequentially generating pseudo-random numbers based on sequentially updated internal variables with a common key secretly shared with a receiver as the initial value; updating the encryption key by generating a new encryption key based on the generated pseudo-random numbers; encrypting and sending the communication text using the updated encryption key; and storing the internal variables at the end of transmission as internal variables for subsequent communication with said receiver.

According to a further aspect, the present invention which achieves these objects relates to: a communication method for receiving and deciphering an encrypted communication text, said communication method comprising the steps of: a receiver sequentially generating pseudo-random numbers based on sequentially updated internal variables with a common key secretly shared with a sender as the initial value; updating the encryption key by generating a new encryption key based on the generated pseudo-random numbers; deciphering the encrypted communication text using the updated encryption key; and storing the internal variables at the end of transmission as internal variables for subsequent communication with said sender.

According to a further aspect, the present invention which achieves these objects relates to: a communication terminal device, comprising: transmitting means for encrypting and sending a communication text using an encryption key; means for a sender sequentially generating pseudo-random numbers based on sequentially updated internal variables with a common key secretly shared with a receiver as the initial value; means for creating a new encryption key based on the generated pseudo-random numbers generated by said pseudo-random number generating means; means for updating the encryption key used by said transmitting means each time an encryption key is created by said encryption key creating means; and means for storing the internal variables, at the end of transmission by said transmitting means, as internal variables for subsequent communication with said receiver.

According to a further aspect, the present invention which achieves these objects relates to: a communication terminal device, comprising: receiving means for receiving and deciphering an encrypted communication text using an encryption key; means for a receiver sequentially generating pseudo-random numbers based on sequentially updated internal variables with a common key secretly shared with a sender as the initial value; means for creating a new encryption key based on the generated pseudo-random numbers generated by said pseudo-random number generating means; means for updating the encryption key used by said receiving means each time an encryption key is created by said encryption key creating means; and means for storing the internal variables, at the end of reception by said receiving means, as internal variables for subsequent communication with said sender.

According to a further aspect, the present invention which achieves these objects relates to: a communication method for encrypting and transmitting a communication text, said communication method comprising the steps of: with regard to the transmitting terminal; sequentially generating pseudo-random numbers based on a common key secretly shared with a receiving terminal, counting the number of times of generating pseudo-random numbers, creating a new encryption key based on the generated pseudo-random numbers, and updating the encryption key, encrypting the communication text using the updated encryption key, and transmitting the encrypted communication text along with the number of times of generation proceeding the encryption of that communication text; and with regard to the receiving terminal; receiving the encrypted communication text along with the number of times of generation proceeding the encryption of that communication text, sequentially generating pseudo-random numbers based on a common key secretly shared with the sending terminal and the number of times of generation received, creating a new encryption key based on the generated pseudo-random numbers, and updating the encryption key, and deciphering the encrypted communication text using the updated encryption key.

According to a further aspect, the present invention which achieves these objects relates to: a communication network connecting a transmitting terminal and a receiving terminal, said communication network comprising: a transmitting terminal, including means for encrypting a communication text using an encryption key, first generating means for sequentially generating pseudo-random numbers based on a common key secretly shared with a receiver, counting means for counting the number of times of generating pseudo-random numbers by said first generating means, first creating means for creating a new encryption key based on the pseudo-random numbers generated by said first generating means, first updating means for updating the encryption key used by said encrypting means each time a new encryption key is created by said first creating means, and means for transmitting the communication text encrypted by said encrypting means, along with the number of times of generation proceeding the encryption of that communication text counted by said counting means; and a receiving terminal, including means for receiving the encrypted communication text along with the number of times of generation proceeding the encryption of that communication text, means for deciphering the encrypted communication text using an encryption key, second generating means for sequentially generating pseudo-random numbers based on a common key secretly shared with the sender and the number of times of generation received, second creating means for creating a new encryption key based on the pseudo-random numbers generated by said second generating means, second creating means for creating a new encryption key based on the pseudo-random numbers generated by said generating means, and second updating means for updating the encryption key used by said receiving means each time a new encryption key is created by said creating means.

Other objects and advantages besides these discussed above shall be apparent to those skilled in the art from the following description of preferred embodiments of the invention. In the description, reference is made to accompanying drawings, which form a part thereof and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

A preferred embodiment according to the present invention will be described with reference to the accompanying drawings.

First Embodiment

<Encryption Method>

The present embodiment involves a cryptosystem for periodically updating block cipher keys with cryptographically secure pseudo-random numbers, in which the block cipher key is updated each time the pseudo-random number generating device outputs $j=k/m$ bits of pseudo-random numbers with regard to the block key length k, thereby shortening the updating cycle and improving safety. Note that in this expression j represents the number of bits of the pseudo-random numbers $b_i$ obtained each time.

Figure 1:
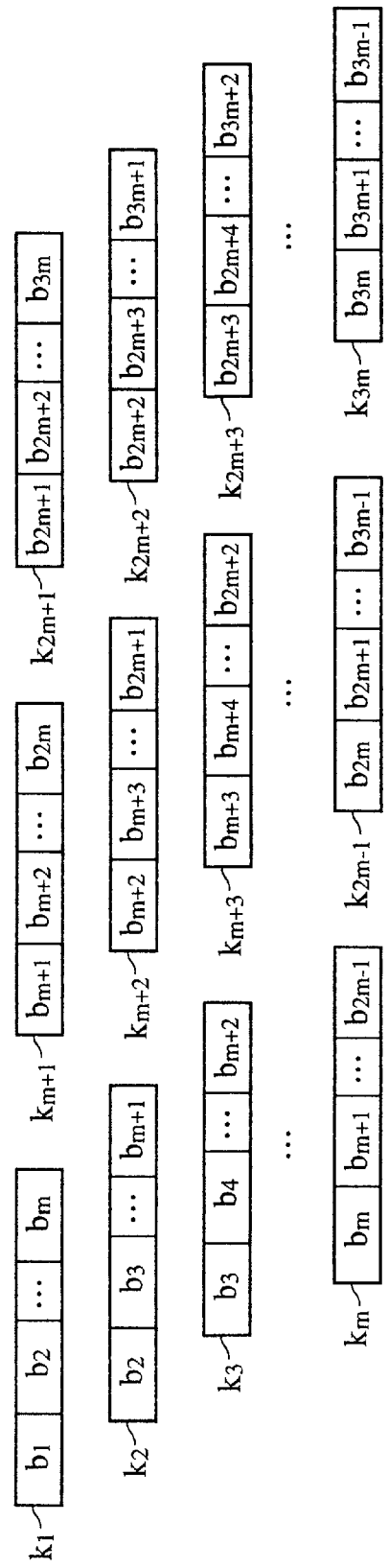
FIG. 1 is a diagram illustrating an example of a block cipher key stream in a first embodiment according to the present invention.
Figure 2:
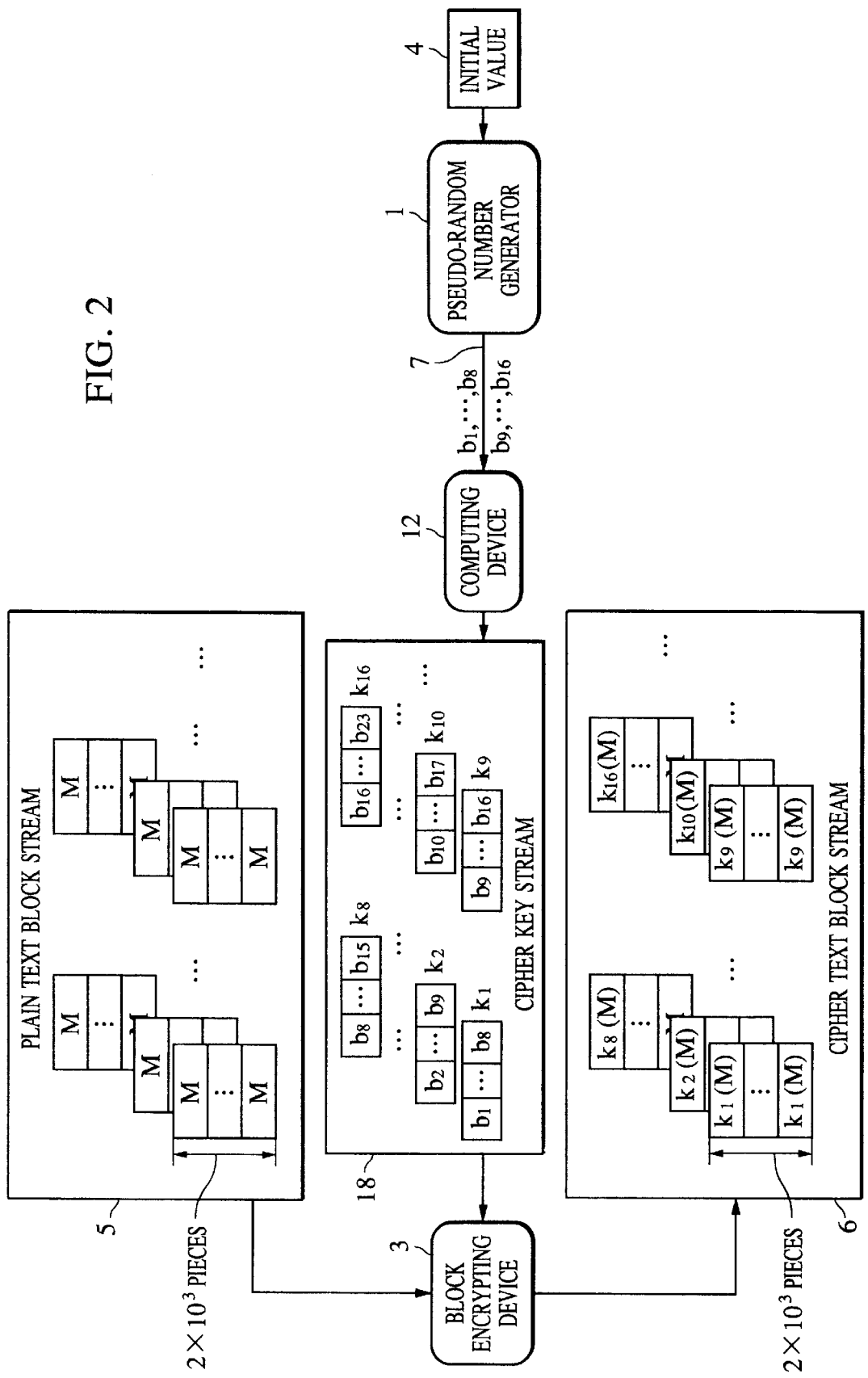
FIG. 2 is a diagram describing encryption processing in the first embodiment.

The method of updating the block cipher key according to the present embodiment will now be described in detail in comparison with the method described in Reference 1. FIG. 1 shows an example of a block cipher key stream according to the present embodiment in the case that j bits of pseudo-random number 7 are output from the pseudo-random number generating device 1 in the manner of $b_1, b_2, \ldots, b_m$, $b_{m+1}, b_{m+2}, \ldots, b_{2m}, b_{2m+1}, b_{2m+2}, \ldots, b_{3m}, \ldots$, and in the case that the size of the block cipher key is m×j bits (j=9, m=8 in the case of <Conditions 1> described in the example of known art); and FIG. 2 illustrates an example of encryption processing.

Figure 26:
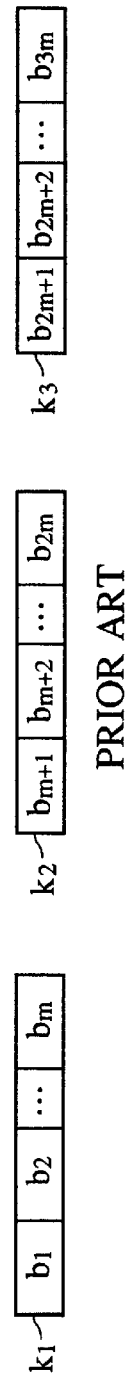
FIG. 26 is a diagram illustrating a block cipher key stream according to a known example.

According to the method described in Reference 1, the block cipher key is not updated until the number of bits of the pseudo-random number 7 output from the pseudo-random number generating device 1 equal the number of bits of the block cipher. That is, as shown in FIG. 26, in the case that the known block cipher key stream is such that j bits of pseudo-random numbers 7 are output from the pseudo-random number generator 1 in the manner of $b_1, b_2, \ldots, b_m$, $b_{m+1}, b_{m+2}, \ldots, b_{2m}, b_{2m+1}, b_{2m+2}, \ldots, b_{3m}, \ldots$, and that the size of the block cipher key is m×j bits, the same as above, the following results:

$k_1 = b_1, b_2, \ldots, b_m$ $k_2 = b_{m+1}, b_{m+2}, \ldots, b_{2m}$ $k_3 = b_{2m+1}, b_{2m+2}, \ldots, b_{3m}$ and so forth.

Figure 23:
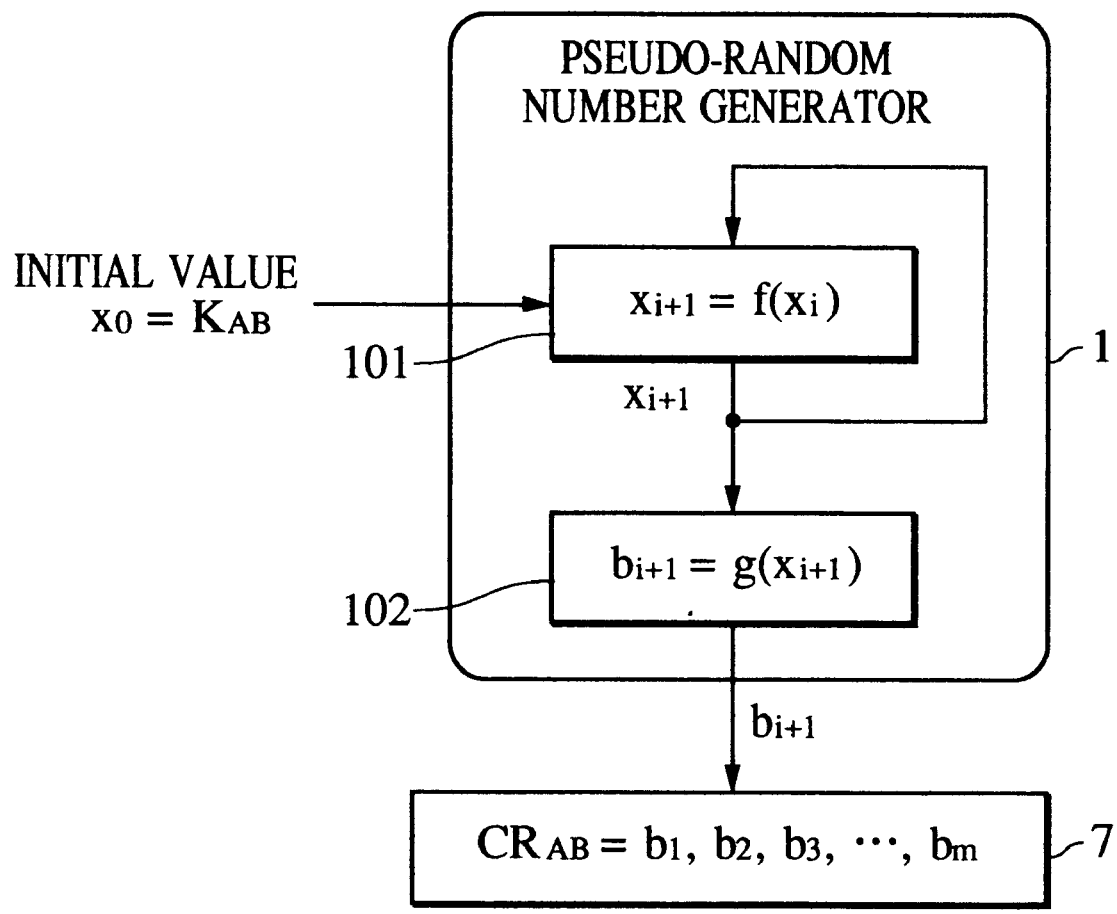
FIG. 23 is a diagram illustrating an example of construction of the pseudo-random number generator.
Figure 24:
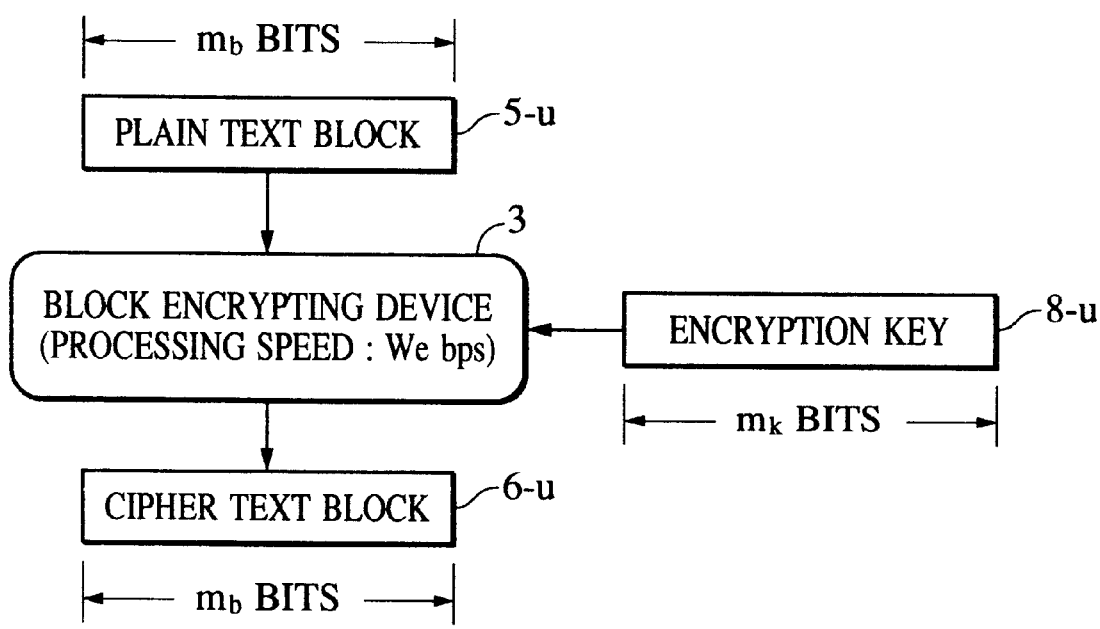
FIG. 24 is a diagram illustrating block cipher specifications.
Figure 25:
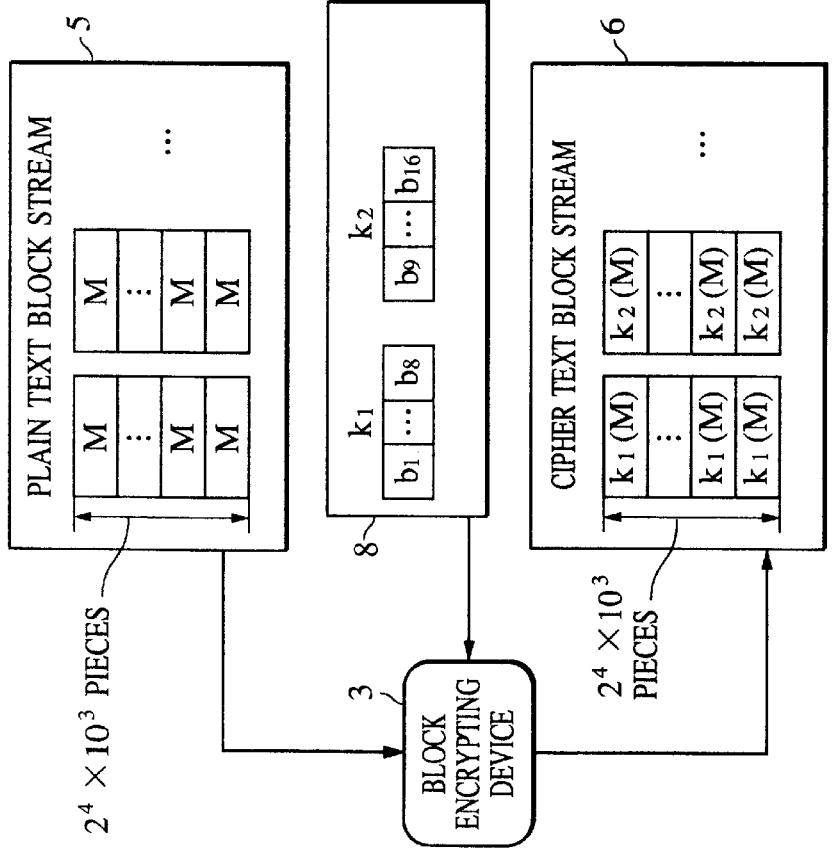
FIG. 25 is a diagram describing block cipher key updating processing according to a known example.

Conversely, with the present embodiment, as shown in FIG. 1, the block cipher key is updated each time pseudo-random numbers 7 are generated by the pseudo-random number generating device 1 which is the same as that of the known art and is shown in FIG. 23. That is, at the point in time that the pseudo-random number generator 1 generates pseudo-random number $b_i$, the block cipher key $k_k = b_{i-m}, b_{i-m+1}, \ldots, b_{i-1}$ at that time is taken in the computing device 12 and the oldest pseudo-random number $b_{i-m}$ at the time of generating is removed from the block cipher key $K_k$ and $b_i$ is substituted therein, thereby obtaining the next block cipher key $k_{k+1}$ of m×j bits.

There is a method wherein the position for inserting $b_i$ is the last position, thereby shifting the entirety. In such a case, the following results:

$k_{k+1} = b_{i-m+1}, b_{i-m+2}, \ldots, b_i$ $k_{k+2} = b_{i-m+2}, b_{i-m+3}, \ldots, b_{i+1}$ That is, in the case of performing key updating according to the present embodiment upon the example in Reference 1 described earlier, the computing device 12 takes the input $b_1$, $b_2, \ldots, b_m, b_{m+1}, b_{m+2}, \ldots, b_{2m}, b_{2m+1}, b_{2m+2}, \ldots, b_{3m}$, ..., such that the block cipher key stream 18 is as shown in FIG. 1, and $k_1, k_2, k_3, \ldots$ are output as:

$k_1 = b_1, b_2, \ldots, b_m$ $k_2 = b_2, b_3, \ldots, b_{m+1}$ $k_3 = b_3, b_4, \ldots, b_{m+2}$ Hence, block cipher key can be updated each time pseudo-random numbers 7 are generated by the pseudo-random number generator 1. That is to say, the updating cycle of the block cipher is shortened by 1/m with the present embodiment as compared to the updating cycle of the method described in Reference 1, thus improving the safety of the block cipher.

Also, there is a method for updating the key, wherein at the point in time that the pseudo-random number generator 1 generates pseudo-random number $b_i$, the block cipher key $k_k = b_{i-m}, b_{i-m+1}, b_{i-m+2}, \ldots, b_{i-1}$, at that time is taken in the computing device 12 and the oldest pseudo-random number $b_{i-m}$ at the time of generating is removed and $b_i$ is substituted therein at that position. Or, the next entire encryption key can be determined based on the pseudo-random number $b_i$ and the encryption key at that time.

<Evaluation of the Encryption>

The advantages of the present embodiment will now be quantitatively evaluated.

For example, in the instance of the aforementioned <Conditions 1>, the number of block cipher keys $w_k$ generated in one second is $w_k = 2^{-3} \times 10^3$ with the known method described in Reference 1. That is, the block cipher key updating cycle is $2^3 \times 10^{-3}$ seconds.

Conversely, with the present embodiment, the block cipher key is updated each time one step of generating cryptographically secure pseudo-random numbers is completed and pseudo-random numbers are generated. For example, FIG. 2 shows block cipher key updating being performed by the first embodiment under the same <Conditions 1>

That is, in FIG. 2, pseudo-random numbers 7 are generated by the pseudo-random number generator 1 from the initial value 4. The computing device 12 calculates and outputs the encryption key stream 18 based on the pseudo-random numbers 7, encodes the plain text stream 5 with this encryption key stream 18 using the block encrypting device 3, and outputs the cipher block stream 6.

Under the aforementioned <Conditions 1>, one step can be performed in $10^{-3}$ (seconds), so the block cipher key updating cycle is $10^{-3}$ seconds. Accordingly, the updating cycle is 1/8 of that described in Reference 1 under the same <Conditions 1>, and in the event that block cipher key updating is performed with this cycle, the key will be updated each time $2 \times 10^3$ blocks are updated. Accordingly, the present embodiment is capable of markedly improving the safety of the cryptosystem perpetually updating the block cipher key with cryptographically secure pseudo-random numbers, as compared to that described in Reference 1.

<Example of the Construction of a Pseudo-random Number Generating Device>

The pseudo-random number generator should be such that generates cryptographically secure pseudo-random numbers with algorithms using square-type random numbers, RSA ciphers, discreet logarithms, inverse number ciphers, etc., but as a specific example, a detailed description will be made regarding a case in which an algorithm using square-type random numbers is employed.

(Square-type Pseudo-random Number Sequence)

A square-type pseudo-random number sequence is a pseudo-random number sequence b1, b2, . . . , generated according to the following procedures, which becomes a cryptographically secure pseudo-random number sequence under the assumption that the sequence is such that judgment of whether the sequence is that of quadratic residue or not is not likely to be made from a perspective of computational complexity.

Now, with p and q as prime numbers wherein (mod 4) holds, and with $N = p \cdot q$, the bit sequence $b_1, b_2, \ldots$ obtained by the initial value $x_0$ (an integer wherein $1 < x_0 < N-1$) and the following recurrent expression, is called a square-type pseudo-random number sequence, the recurrent expression being:

$$x_{i+1} = x_i^2 \bmod N \ (i=0, 1, 2, \ldots)$$

$$b_1 = lsb_j (x_i) \ (i=1, 2, \ldots) \quad (1)$$

wherein $lsb_j (x_i)$ represents the lower j bits of $x_i$, and wherein $j = O(\log_2 n)$ holds with n as the number of bits of N.

According to the above procedures, j bits of the pseudo-random number $b_1$ can be generated in one step.

Specific description of a block cipher key updating method according to the present embodiment using such square-type pseudo-random numbers will now be made. In order to facilitate ease of description, the block cipher key bit length is 72 in the description, as with the aforementioned <Conditions 1>. Also in the description, n is 512 bits, and the pseudo-random number sequence $b_1$ (i=1, 2, . . . ) obtained by each squaring calculation is described as being a 9-bit pseudo-random number sequence.

<Example of updating the block cipher key)

The block key can be updated each time squaring calculation is performed (with each step), according to the following procedures.

(1) With v=1, the initial value $x_0$ ($1 < x_0 < N-1$) is provided to the pseudo-random number generator 1 (square-type), eight steps of the squaring calculation of Expression 1 are performed, the pseudo-random number output 7 thereof is used as input for the computing device 12 which outputs the first key of the 72 bits of the block cipher as $k_v = k_1 = b_v, b_{v+1}, b_{v+2}, \ldots, b_{v+7} = b_1, b_2, b_3, b_4, b_5, b_6, b_7, b_8$. (Output of encryption key stream 18)

(2) $k_v = b_v, b_{v+1}, b_{v+2}, \ldots, b_{v+7}$ is set as the block cipher key 18, and encryption of the predetermined plurality of plain text block streams 5 is performed.

(3) The pseudo-random number generating device 1 (square-type), performs the (v+8)th step of the squaring calculation, and outputs $b_{v+8}$. Once $b_{v+8}$ is input, the oldest pseudo-random number by in the block cipher key $k_v = b_v$, $b_{v+1}, b_{v+2}, \ldots, b_{v+7}$ at that point is removed, $b_{v+8}$ is added to the end, $k_{v+1} = b_{v+1}, b_{v+2}, b_{v+3}, b_{v+8}$ is calculated, and output as the block cipher key 18. (4) With v=v+1, the procedures 2 and 3 are repeated until encryption is completed. Thus, with the block cipher key 8 to be updated as $k_1$, $k_2, k_3, \ldots$, according to the method described in Reference 1, the following was obtained;

$$k_1 = b_1, b_2, b_3, b_4, b_5, b_6, b_7, b_8$$

$$k_2 = b_9, b_{10}, b_{11}, b_{12}, b_{13}, b_{14}, b_{15}, b_{16}$$

$$k_3 = b_{17}, b_{18}, b_{19}, b_{20}, b_{21}, b_{22}, b_{23}, b_{24}$$

and so forth;

however, according to the present embodiment, the above procedures update the block cipher key 18 each time squaring calculation is performed (one step), as follows:

$$k_1 = b_1, b_2, b_3, b_4, b_5, b_6, b_7, b_8$$

$$k_2 = b_2, b_3, b_4, b_5, b_6, b_7, b_8, b_9$$

$$k_3 = b_3, b_4, b_5, b_6, b_7, b_8, b_9, b_{10}$$

and so forth;
which means that the updating cycle of the block cipher has been shortened.

Also, the above-described arrangement involved adding $b_{v+8}$ to the end position, but $b_{v+8}$ may be added to the position of the oldest pseudo-random number, thereby creating $k_{v+1} = b_{v+8}, b_{v+1}, b_{v+2}, \ldots, b_{v+7}$.

Also, an arrangement may be employed wherein the entire encryption key is changed based on $b_{v+8}$ and the encryption key $k_v$ at that point in time. That is, with the function thereof represented as G, the calculation may be $K_{v+1} = G(b_{v+8}, k_v)$.

As described above in detail, according to the present embodiment, the block cipher key is updated each time calculation necessary for generating cryptographically secure pseudo-random numbers is completed, with regard to a cryptosystem periodically updating the block cipher key with cryptographically secure pseudo-random numbers, thereby shortening the updating cycle as compared to that of the updating method described in Reference 1, consequently increasing safety.

<First Example of Encrypted Communication>

Figure 3:
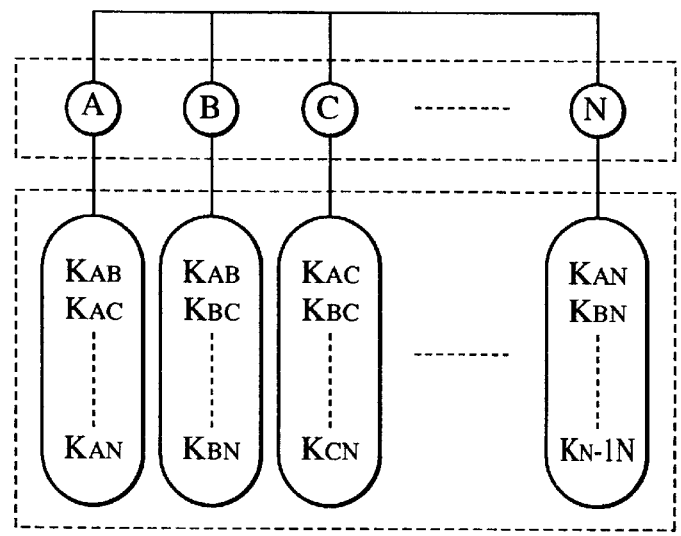
FIG. 3 is a diagram illustrating an example of a communication network with regard to the first and second embodiments.

With the network shown in FIG. 3, unique and secret keys are shared by the network subscribers beforehand. As described above, A, B, C, . . . N represent network subscribers, $K_{AB}$ is a key shared between the subscribers A and B, $K_{AC}$ is a key shared between the subscribers A and C, and so forth. Sharing of the key can be realized either by the network administrator or the like setting the key, or by a known key sharing method.

Figure 4:
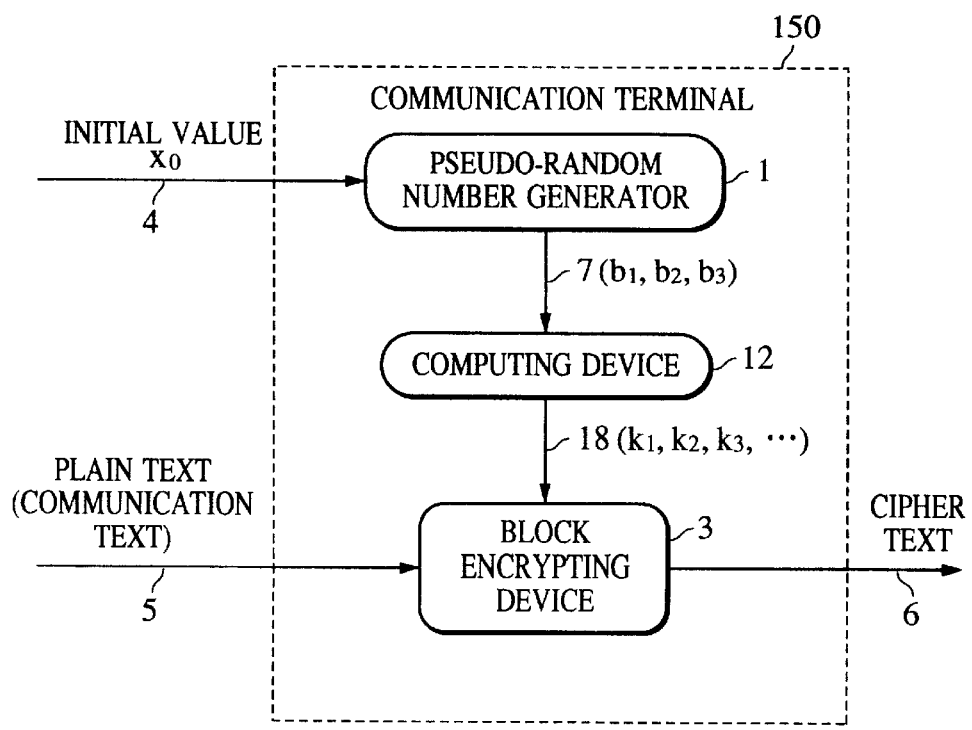
FIG. 4 is a diagram illustrating an example of the communication terminal in the first embodiment.

Further, each subscriber has a communication terminal 150 such as shown in FIG. 4, i.e., a communication terminal 150 comprising; an encryption device 3 for performing encryption (deciphering) following an algorithm stipulated on the network; a pseudo-random number generator 1 for generating cryptographically secure pseudo-random numbers following an algorithm stipulated on the network; and a computing device 12 for converting the pseudo-random numbers 7 output from the pseudo-random number generator 1 into a key stream 18.

The present embodiment will be described with reference to an instance in which DES cipher is used as the encryption (deciphering) algorithm, and square-type pseudo-random numbers are used as the algorithm for generating cryptographically secure pseudo-random numbers. DES cipher is a shared-key block cipher of a open-algorithm type, with the block size of plain text and cipher text being 64 bits and the size of the key being 56 bits. In order to make the square-type pseudo-random numbers sufficiently safe, the number of bits n of the modulo N of squaring calculation (Expression (1)) shall be set at 512. In the event that n is 512 bits, the pseudo-random number sequences $b_i$ (i=1, 2, ...) obtained by one step of squaring calculations are each pseudo-random number sequences of around 9 bits. In order to facilitate ease of description of the present embodiment, the pseudo-random numbers output from the pseudo-random number generator 1 shall be described as being 8 bits per step (take the lower 8 bits of further lower order than the 9 bits obtained by Expression (1)), such being $b_i$ (i=1, 2, ...). Accordingly, the pseudo-random number sequences $b_i$ (i=1, 2, ...) are each 8 bits. Also, the keys (initial value of the pseudo-random number generating device) $K_{AB}$, $K_{AC}$, . . . secretly shared between the subscribers beforehand are such that $1 < K_{AB}, K_{AC}, \ldots < N-1$.

Procedures for encrypted communication from subscriber A to B according to the present embodiment will now be described.

(Procedures for the Subscriber A)

(1) A secret key $K_{AB}$ which is distributed beforehand and is shared with the destination B is provided to the pseudo-random number generator 1 (square-type) as the initial value $x_0$ ($1 < x_0 < N-1$), seven steps of the squaring calculation of Expression (1) are performed, and the pseudo-random number generator 1 (square-type) outputs $b_1, b_2, b_3, \ldots, b_7$. The computing device 12 uses the input $b_1, b_2, b_3, \ldots, b_7$ as the as the first key of the 56 bits of the block cipher, and with v=1 outputs $k_v = k_k = b_v, b_{v+1}, b_{v+2}, \ldots, b_{v+6} = b_1, b_2, b_3, b_4, b_5, b_6, b_7$.

(2) $k_v = b_v, b_{v+1}, b_{v+2}, \ldots b_{v+6}$ is set as the DES cipher key, encryption of a certain predetermined number of plain text blocks is performed, and the blocks are sequentially sent to B upon encryption thereof.

(3) The pseudo-random number generator 1 (square-type) performs the (v+7)th step of the squaring calculation, and outputs $b_{v+7}$. Once $b_{v+7}$ is input to the computing device 12, the leading 8 bits $b_v$ of the block cipher key $k_v = b_v, b_{v+1}, b_{v+2}, \ldots b_{v+6}$ at that point is removed, $b_{v+7}$ is added to the end, $k_{v+1} = b_{v+1}, b_{v+2}, b_{v+3}, \ldots, b_{v+7}$ is calculated, and output as the block cipher key.

(4) With v=v+1, the procedures (2) and (3) are repeated until encryption is completed.

(Procedures for the Subscriber B)

(1) The secret key $K_{AB}$ which is distributed beforehand and is shared with the receiver B is provided to the pseudo-random number generator 1 (square-type) as the initial value $x_0$ ($1 < x_0 < N-1$), seven steps of the squaring calculation of Expression (1) are performed, and the pseudo-random number generator 1 (square-type) outputs $b_1, b_2, b_3, \ldots, b_7$. The computing device 12 uses the input $b_1, b_2, b_3, \ldots, b_7$ as the as the first key of the 56 bits of the block cipher, and with v=1 outputs $k_v = k_k = b_v, b_{v+1}, b_{v+2}, \ldots, b_{v+6} = b_1, b_2, b_3, b_4, b_5, b_6, b_7$.

(2) $k_v = b_v, b_{v+1}, b_{v+2}, \ldots, b_{v+6}$ is set as the DES cipher key, and deciphering of a certain predetermined number of plain text blocks is performed upon the text received from A.

(3) The pseudo-random number generating device 1 (square-type) performs the (v+7)th step of the squaring calculation, and outputs $b_{v+7}$. Once $b_{v+7}$ is input to the computing device 12, the leading 8 bits of the block cipher key $k_v = b_v, b_{v+1}, b_{v+2}, \ldots, b_{v+6}$ at that point is removed, $b_{v+7}$ is added to the end, $k_{v+1} = b_{v+1}, b_{v+2}, b_{v+3}, \ldots, b_{v+7}$ is calculated, and output as the block cipher key.

(4) With v=v+1, the procedures (2) and (3) are repeated until encryption is completed.

According to these procedures, the block cipher key can be updated each time calculation necessary for generating cryptographically secure pseudo-random numbers is completed, thereby shortening the updating cycle and consequently increasing safety.

<Example of the Construction of the Computing Device 12>

In the above procedure (3), processing is performed in which once $b_{v+7}$ is input to the computing device 12, the leading 8 bits of the block cipher key $k_v = b_v, b_{v+1}, b_{v+2}, \ldots, b_{v+6}$ at that point is removed, $b_{v+7}$ is added to the end, $k_{v+1} = b_{v+1}, b_{v+2}, b_{v+3}, \ldots, b_{v+7}$ is calculated, and output as the block cipher key; this being the same as adding the newly-obtained pseudo-random number $b_{v+7}$ to the end of the block cipher key and shifting the block cipher key by $b_{v+7}$.

Figure 5:
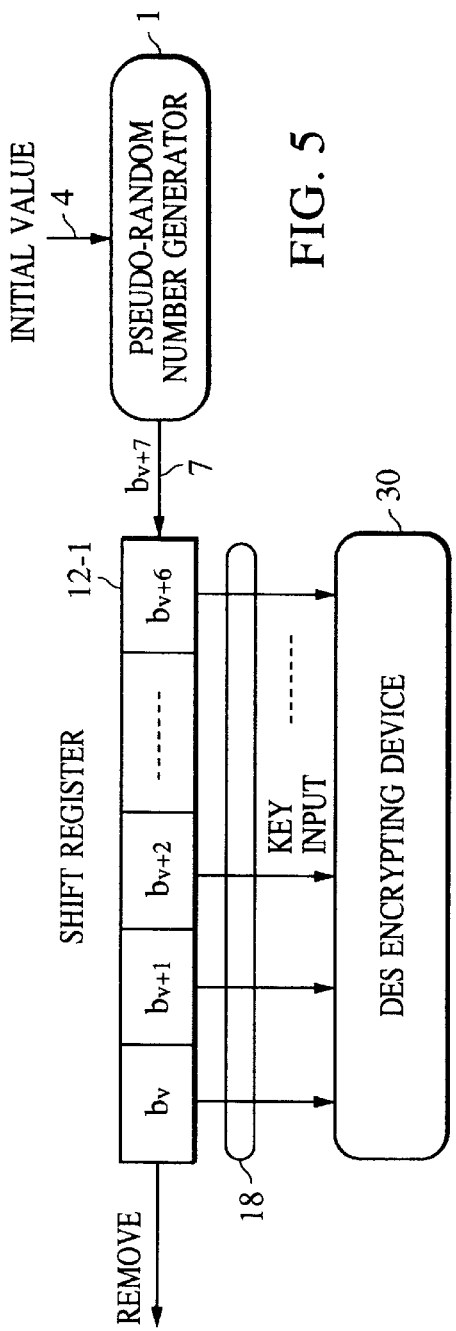
FIG. 5 is a diagram illustrating an example of configuration of a computing device using a shift register.

Accordingly, the computing device 12 which performs this processing can be realized by using a shift register 12-1 as shown in FIG. 5. That is, the block cipher key bit stream is sequentially stored in the serial input/parallel output shift register 12-1, and such that the key is output from parallel output to DES encrypting device 30. In the event of updating the block cipher key from $k_v = b_{v+1}, b_{v+1}, b_{v+2}, \ldots, b_{v+6}$ to $k_{v+1} = by+, b_{v+2}, b_{v+3}, \ldots, b_{v+7}$, the new pseudo-random number $b_{v+7}$ is input by being shifted eight times from serial input. The leading bit of the block cipher key $k_v$ before updating is removed from the leading register. Accordingly, the procedure (3) of the subscriber B can be performed as processing by a computing device 12.

Or, eight serial input/parallel output shift registers may be provided, such that each shift register is shifted once upon the 8-bit $b_{v+7}$ being output from the pseudo-random number generator so as to input one bit to each of the shift registers, thereby performing the processing of the computing device 12.

Also, in the above procedure (3), $b_{v+7}$ is added to the end by the computing device 12, but an arrangement may be employed wherein once $b_{v+7}$ is input, the oldest pseudo-random number $b_v$ in the block cipher key $k_v = b_v, b_{v+1}, b_{v+2}, \ldots, b_{v+6}$ at that point is removed, $b_{v+7}$ is added to that position, $k_{v+1} = b_{v+7}, b_{v+1}, b_{v+2}, \ldots, b_{v+6}$ is calculated, and output as the block cipher key. In this case, this processing consists of storing the newly-obtained pseudo-random number $b_{v+7}$ to the area where the oldest pseudo-random number $b_v$ had been stored.

Figure 6:
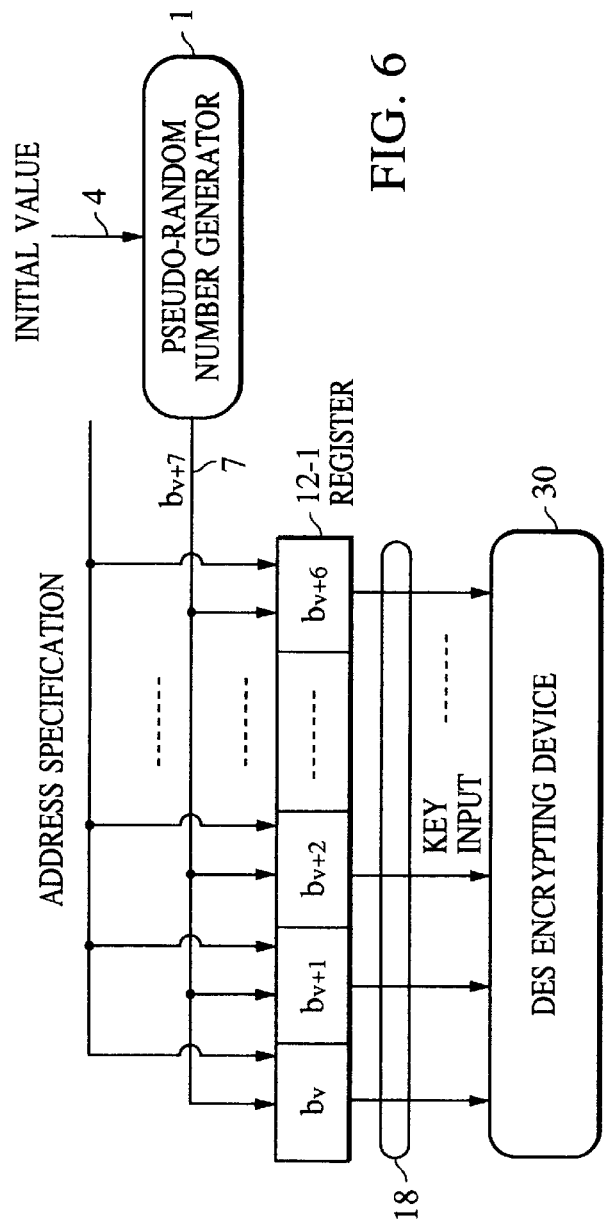
FIG. 6 is a diagram illustrating an example of configuration of a computing device using a register.

Accordingly, this processing can be realized by using a register 12-2 such as shown in FIG. 6 for the computing means 12. The block cipher key bit stream is sequentially stored from the first register, and the key is input by parallel output for the block cipher. In the event of updating the block cipher key from $k_v = b_v, b_{v+1}, b_{v+2}, b_{v+6}$ to $k_{v+1} = b_{v+7}, b_{v+1}, b_{v+2}, \ldots, b_{v+6}$, the address of $b_v$ is specified and the new pseudo-random number $b_{v+7}$ is written therein, thereby performing the processing as a computing device 12.

In the above procedures, the pseudo-random number sequences $b_i$ (i=1, 2, ...) are each 8 bits, but the basic procedures are the same even in the event that the pseudo-random number sequences $b_i$ (i=1, 2, . . . ) are each 9 bits. However, the $b_1, b_2, b_3, \ldots, b_7$ obtained in procedure (1) is 63 bits, so there is the need to use procedures shared between the sender and receiver to remove 7 bits from $b_1, b_2, b_3, \ldots, b_7$. (see FIG. 5) for use as the DES cipher key $k_k$. Also, with regard to procedures (3), where the leading 8 bits of the block cipher key $k_v = b_v, b_{v+1}, b_{v+2}, \ldots, b_{v+6}$ are removed, the leading 9 bits are removed instead.

<Second Example of Encrypted Communication>

Description will be made with the network shown in FIG. 3, the same as with the First example of encrypted communication. Also, each subscriber has a communication terminal 150 such as shown in FIG. 4, as with the First example of encrypted communication.

This embodiment also will be described with reference to an instance in which DES cipher is used as the encryption (deciphering) algorithm, and square-type pseudo-random numbers are used as the algorithm for generating cryptographically secure pseudo-random numbers. In order to make the square-type pseudo-random numbers sufficiently safe, the number of bits n of the modulo N of squaring calculation (Expression (1)) shall be set at 512. In the event that n is 512 bits, the pseudo-random number sequences $b_i$ (i=1, 2, . . . ) obtained by one step of squaring calculations are each pseudo-random number sequences of 9 bits. Accordingly, 9 bits of pseudo-random number sequences are output from the pseudo-random number generating device 2 per step. Also, the keys (initial value of the pseudo-random number generator) $K_{AB}, K_{AC}, \ldots$ secretly shared between the subscribers beforehand are such that $1 < K_{AB}, K_{AC}, \ldots < N-1$.

Procedures for encrypted communication from subscriber A to B according to the present embodiment will now be described.

(Procedures for the Subscriber A)

(1) A secret key $K_{AB}$ which is distributed beforehand and is shared with the destination B is provided to the pseudo-random number generator 1 (square-type) as the initial value $x_0$ ($1 < x_0 < N-1$), seven steps of the squaring calculation of Expression (1) are performed, and with v=1, the pseudo-random number generating device 1 (square-type) outputs $b_v = b_1$ as the pseudo-random number 7. The computing device 12 calculates and outputs the first block cipher key $k_v = k_k$ from b, and the initial value $x_0$, using a ROM or the like storing a table according to a certain rule.

(2) $k_v$ is set as the DES cipher key, encryption of a certain predetermined number of plain text blocks is performed, and the blocks are sequentially sent to B upon encryption thereof.

(3) The pseudo-random number generator 1 (square-type) performs the (v+1)th step of the squaring calculation, and outputs $b_{v+1}$. Once $b_{v+1}$ is input to the computing device 12, the next block cipher key is calculated and output based on the block cipher key $k_v$ at that time, using a ROM or the like storing a table according to a certain rule.

(4) With v=v+1, the procedures (2) and (3) are repeated until encryption is completed.

(Procedures for the Subscriber B)

(1) The secret key $K_{AB}$ which is distributed beforehand and is shared with the destination B is provided to the pseudo-random number generator 1 (square-type) as the initial value $x_0$ ($1 < x_0 < N-1$), seven steps of the squaring calculation of Expression (1) are performed, and with v=1, the pseudo-random number generator 1 (square-type) outputs $b_v = b_1$ as the pseudo-random number 7. The computing device 12 calculates and outputs the first block cipher key $k_v = k_k$ from $b_1$ and the initial value $x_0$, using a ROM or the like storing a table according to a certain rule.

(2) $k_v$ is set as the DES cipher key, and decryption of a certain predetermined number of plain text blocks is performed on the text received from A.

(3) The pseudo-random number generator 1 (square-type) performs the (v+1)th step of the squaring calculation, and outputs $b_{v+1}$. Once $b_{v+1}$ is input to the computing device 12, the next block cipher key is calculated and output based on the block cipher key $k_v$ at that time, using a ROM or the like storing a table according to a certain rule.

(4) With v=v+1, the procedures (2) and (3) are repeated until encryption is completed.

According to these procedures, the block cipher key can be updated each time calculation necessary for generating cryptographically secure pseudo-random numbers is completed, thereby shortening the updating cycle and consequently increasing safety.

<Second Example of the Construction of the Computing Device 12>

Figure 7:
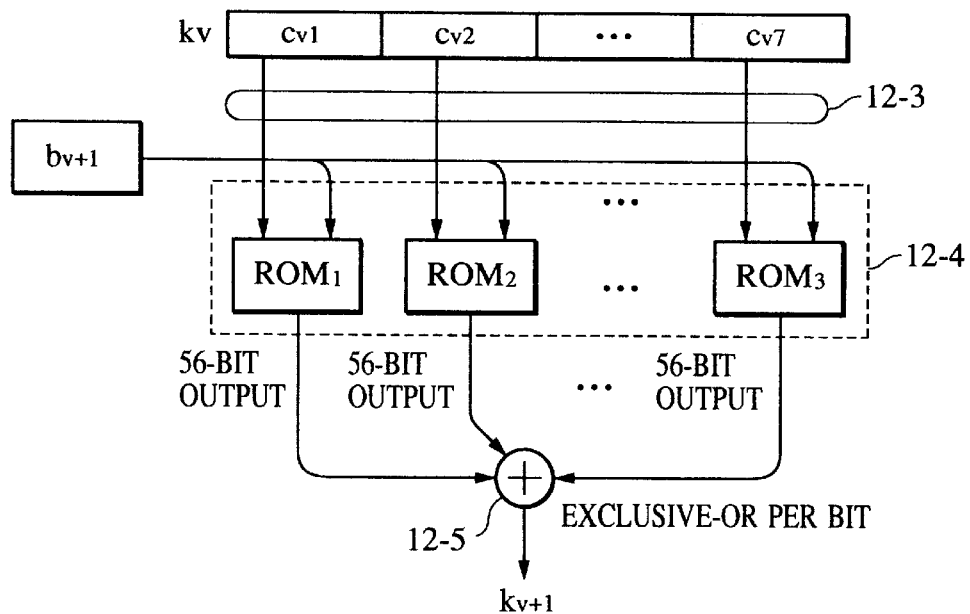
FIG. 7 is a diagram illustrating an example of configuration of a computing device using a ROM.

In the above procedure (3), once $b_{+1}$ is input to the computing device 12, the next block cipher key is calculated and output based on the block cipher key $k_v$ at that time, using a ROM or the like storing a table according to a certain rule. This processing can be realized by a computing device 12 such as described in FIG. 7 comprising a ROM 12-4 storing a table according to a certain rule and an adder 12-5 for taking the Exclusive-OR per bit of the output of the ROM 12-4. In FIG. 7, $k_v$(12-3) is represented as $c_{v1}, c_{v2}, \ldots, c_{v7}$, each $c_{vi}$ (i=1. 2, . . . , 7) being 8 bits. The seven ROMs 12-4 shown in FIG. 7, i.e., $ROM_1, ROM_2, \ldots, ROM_7$ each have a 17-bit address and output 56 bits. The 56-bit output from each of the $ROM_i$ (i=1, 2, . . . , 7) has the Exclusive-OR thereof taken per bit, the output thereof being used for generating the next DES encryption key $k_{v+1}$. Input in the 17-bit address of the $ROM_i$ (i=1, 2, . . . , 7) are the 8 bits of $c_{vi}$ (i=1. 2, . . . , 7) and the 9 bits of $b_{v+1}$. Accordingly, the overall block cipher key can be updated each time pseudo-random numbers are output.

In the above description, $k_v$ is divided into seven $c_{vi}$ (i=1, 2, . . . , 7), each being 8 bits, but this division can be into any number. For example in the event that $k_v$ is divided into fourteen $C_{vi}$ (i=1, 2, . . . , 14), each being 4 bits, the necessary ROMs are fourteen, i.e., $ROM_1, ROM_2, \ldots, ROM_{14}$, each with 13 bits (the 4 bits of $c_{v1}$ (i=1. 2, . . . , 14) and 9 bits of $b_{v+1}$), each outputting 56 bits. The 56-bit output from each of the $ROM_i$ (i=1, 2, . . . , 14) has the Exclusive-OR thereof taken per bit, the output thereof being used for generating the next DES encryption key.

Second Embodiment

As with the first embodiment, with the second embodiment also unique and secret keys are shared by the network subscribers beforehand, as shown in FIG. 3. As described above, A, B, C, . . . , N represent network subscribers, $K_{AB}$ is a key shared between the subscribers A and B, $K_{AC}$ is a key shared between the subscribers A and C, and so forth. Sharing of the key can be realized either by the network administrator or the like setting the key, or by a known key sharing method.

Figure 8:
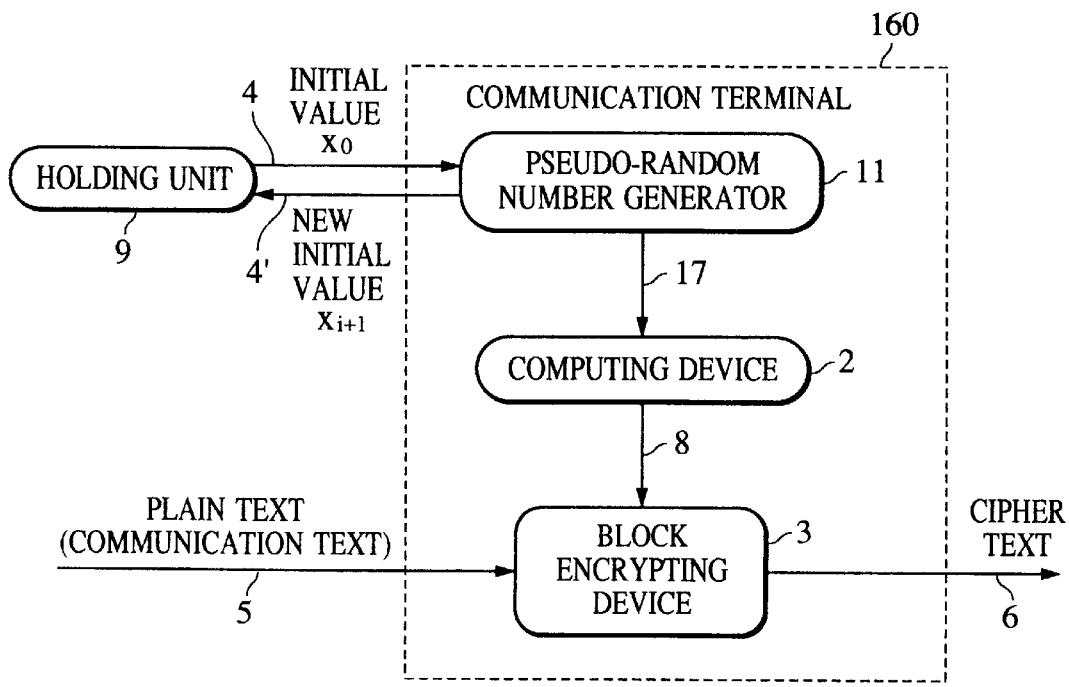
FIG. 8 is a diagram describing the communication terminal in the second embodiment.

Further, each subscriber has a communication terminal 160 such as shown in FIG. 8, i.e., a communication terminal 160 comprising; an encryption device 3 for performing encryption (deciphering) following an algorithm stipulated on the network; a pseudo-random number generator 11 for generating cryptographically secure pseudo-random numbers following an algorithm stipulated on the network; and a computing device 2 for converting the pseudo-random numbers 17 output from the pseudo-random number generating device 11 into a key stream 8 for the encryption device 3, and each subscriber has a holding unit 9 for holding the value of the internal variable of the pseudo-random number generator 11.

Figure 9:
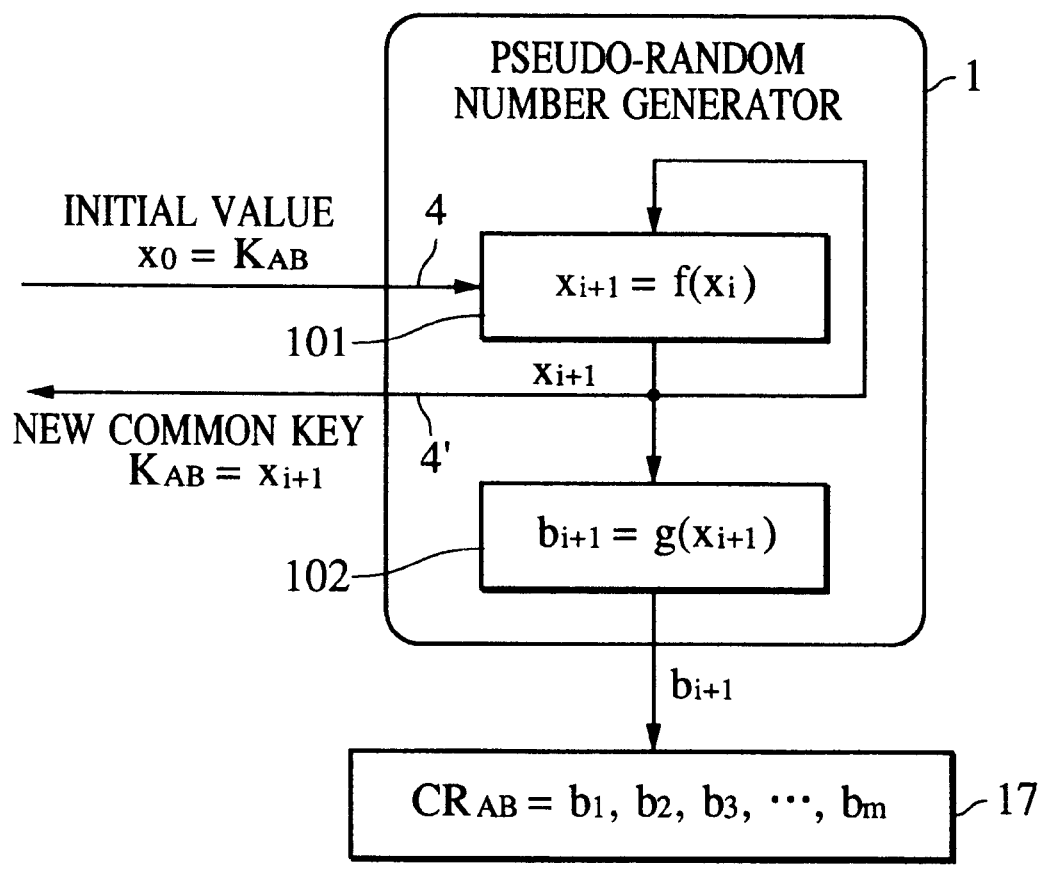
FIG. 9 is a diagram illustrating an example of a pseudo-random number generating device in the second embodiment.

The pseudo-random number generator 11 is of a construction such as shown in FIG. 9 which is generally the same as that of the first embodiment shown in FIG. 23, and the operations thereof also are generally the same as those described with reference to FIG. 23. The difference is that with the present embodiment, the value 4' of the internal variable of the pseudo-random number generating device 11 can be read, and that the arrangement is provided with a holding unit 9 for holding the value of the internal variable thereof.

Figure 10:
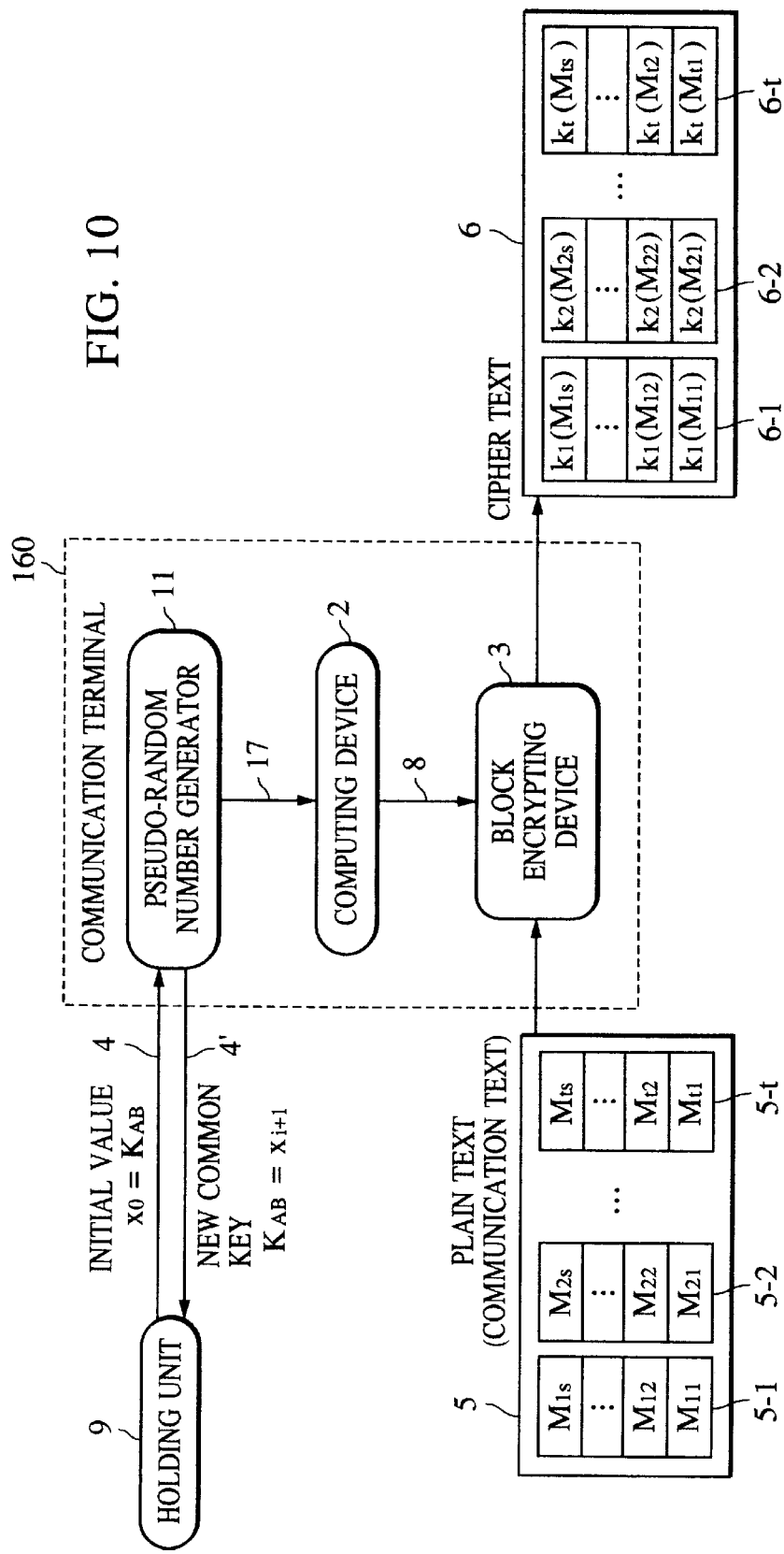
FIG. 10 is a diagram illustrating an example of a encrypted communication in the second embodiment.

In the FIG. 10 showing an example of encrypted communication according to the present embodiment and the later-described FIG. 13, $M_{uv}$ (u=1, 2, . . . , t:v=1, 2, . . . , s) represents plain text block 5, $k_u$ (u=1, 2, . . . , t) represents the key stream 8 of the block cipher, $k_u$ ($M_{uv}$) (u=1, 2, . . . , t:v=1, 2, . . . , s) is the key stream $k_u$ of the plain text block stream $M_{uv}$, each being bit stream of lengths determined by the block cipher algorithm.

Encrypted communication from subscriber A to B according to the present embodiment is performed according to the following procedures.

<Third Example of Encrypted Communication>

(1) A sets the secret key $K_{AB}$ which is shared with the destination B beforehand at the initial value $X_0$ of the pseudo-random number generator 11 and operates the pseudo-random number generator 11, thereby generating a cryptographically secure pseudo-random number stream 17 ($CR_{AB}$). Further, $CR_{AB}$ is converted into a block cipher key stream $k_1$, $k_2$, . . . , $k_t$, by the computing device 2. These are used while periodically updating as block cipher keys, thereby encrypting the plain text block stream 5 (communication text $M_{uv}$; u=1, 2, . . . , t:v=1, 2, . . . , s) with the encryption device 3, and the encrypted cipher text block stream 6 ($k_u$ ($M_{uv}$); u=1, 2, . . . , t:v=1, 2, . . . , s) is sent to the destination B.

(2) B sets the secret key $K_{AB}$ which is shared with the sender A beforehand at the initial value $X_0$ of the pseudo-random number generator 11 and operates the pseudo-random number generator 11, thereby generating a cryptographically secure pseudo-random number stream 17 ($CR_{AB}$). Further, $CR_{AB}$ is converted into a block cipher key stream $k_1$, $k_2$, . . . , $k_t$, by the computing device 2. These are used while periodically updating as block cipher keys, thereby deciphering the encrypted cipher text block stream 6 ($k_u$ ($M_{uv}$); u=1, 2, . . . , t:v=1, 2, . . . , s) from A with the encryption device 3, thereby obtaining the plain text block stream 5 (communication text $M_{uv}$; u=1, 2, . . . , t:v=1, 2, . . . , s).

(3) A stores in the holding unit 9 the value 4' of the internal variable $xi_{+1}$ of the pseudo-random number generator 11 following encryption of the communication text as the new key (initial value for the pseudo-random number generating device) $K_{AB}$ for subsequent encrypted communication with B.

(4) B stores in the holding unit 9 the value 4' of the internal variable $xi_{+1}$ of the pseudo-random number generator 11 following encryption of the communication text as the new key (initial value for the pseudo-random number generator) $K_{AB}$ for subsequent encrypted communication with A.

According to these procedures, the initial value input to the pseudo-random number generator 11 is changed even if the other party with which communication is being made is the same party each time, the same key stream is not generated as an initial value from the pseudo-random number generating device 11, hence the encrypted text is encrypted with a different key stream even if the other party to which the encrypted text is being sent is the same party each time, consequently improving the safety of the block cipher.

<Example of Construction of the Pseudo-random Number Generating Device 11>

Figure 11:
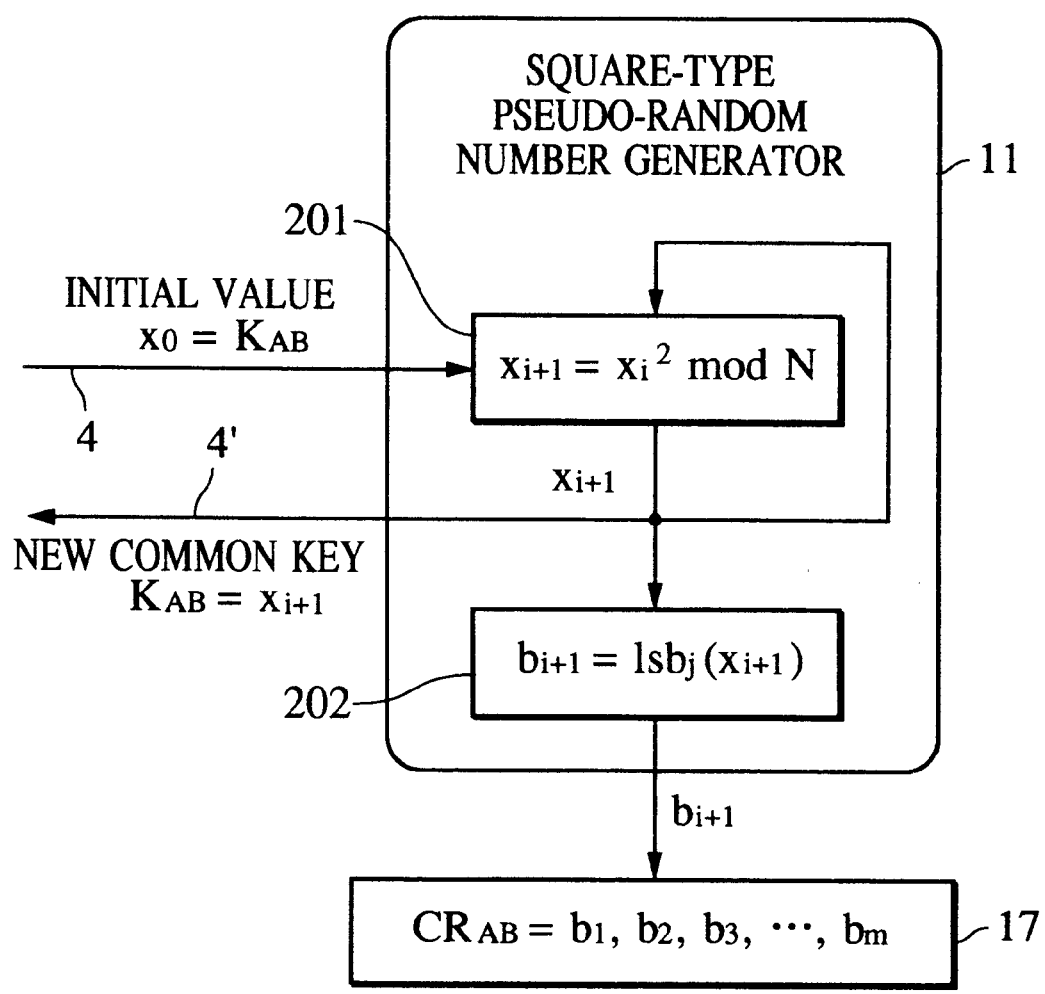
FIG. 11 is a diagram illustrating an example of a pseudo-random number generator which generates square-type pseudo-random numbers.

The pseudo-random number generator 11 is such that generates cryptographically secure pseudo-random numbers with algorithms using square-type random numbers, RSA ciphers, discreet logarithms, inverse number ciphers, etc., but an example of the pseudo-random number generator 11 for generating a square-type random number sequence is shown in FIG. 11. With regard to the pseudo-random number generating device 11, a computing unit which squares the input and obtains the quadratic residue as to N is used as the function represented by $f(x_i)$ in FIG. 9, as shown in 201. Further, in FIG. 9, calculation taking the lower j bits of input as the function represented by $f(x_{i+1})$ is used, as shown in 202. Also, in FIG. 11, the internal variable $x_{i+1}$ can be read.

Figure 12A:
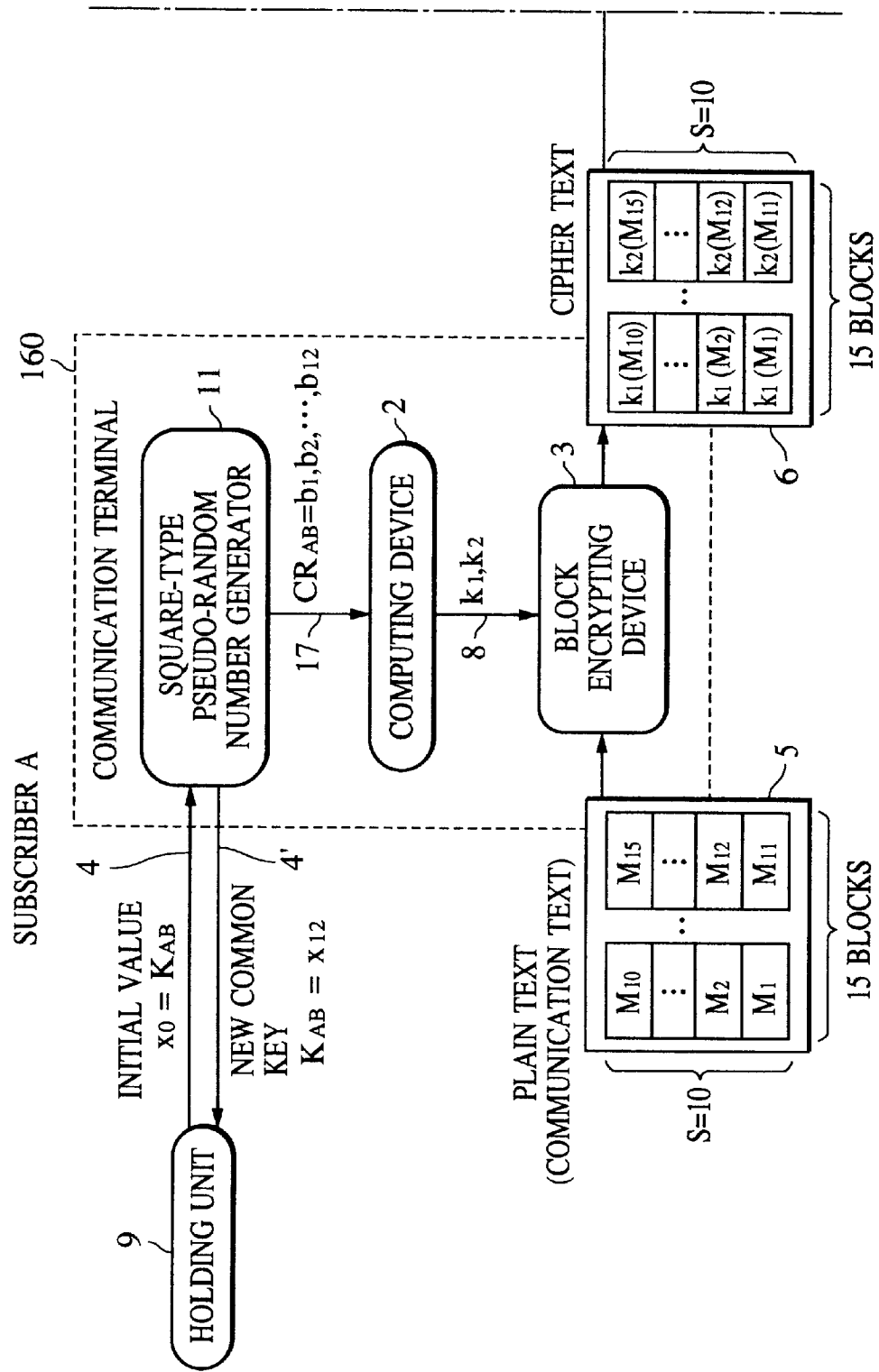
FIG. 12, consisting of FIGS. 12A and 12B, is a diagram describing encrypted communication using a square-type pseudo-random number generator.

Next, encrypted communication between the subscribers A and B using the pseudo-random number generating device 11 shown in FIG. 11 will be described with reference to FIG. 12.

As an example, the number of bits n shall be set at 512, and the block cipher key at 54 bits. A and B secretly share beforehand a key $K_{AB}$ (initial value for the pseudo-random number generator 11; $1<x_0<N-1$). In the event that n is 512 bits, the pseudo-random number sequences $b_i$ (i=1, 2, . . . ) obtained by one step of squaring calculations are each pseudo-random number sequences of around 9 bits. Here, calculation will be made with 9 bits, for the sake of simplicity in calculation. Further, the number of blocks s to be encrypted with one key is set at "10", and that the communication text to be encrypted is divided into "15" plain text blocks. In this case, two encryption keys, $k_1$ and $k_2$ are necessary. The two encryption keys $k_1$ and $k_2$ total 108 bits, so there is the need to perform squaring calculation 12 times (12 (times)×9 (bits/time)=108 (bits)). In this case, the internal variable of the pseudo-random number generator 11 at the time of completing encryption is $x_{12}$ (=$x_0$^2^12 mod N). Here, "a^b" means "a" to the "b"th power, i.e., "$a^b$".

<Fourth Example of Encrypted Communication>

(1) A sets the secret key $K_{AB}$ which is shared with the destination B beforehand at the initial value $X_0$ of the pseudo-random number generator 11 and generates a cryptographically secure pseudo-random number stream 7 ($b_1$, $b_2$, . . . $b_{12}$). In the event that n is 512 bits, the pseudo-random number sequences $b_i$ (i=1, 2, . . . ) obtained by one step of squaring calculations are each pseudo-random number sequences of 9 bits. The obtained pseudo-random number sequences $b_1$, $b_2$, . . . , $b_{12}$ are divided into block cipher key bit lengths (54 bits) from the beginning by means of the computing device 12 (each being represented as $k_1$, $k_2$, . . . , and these are sequentially used as the block cipher keys 8. At the block encrypting device 3, the first ten plain text blocks are encrypted using key $k_1$, the next five plain text blocks (communication text) are encrypted using key $k_2$, and the encrypted cipher text block stream 6 is sent to the destination B.

(2) B sets the secret key $K_{AB}$ which is shared with the sender A beforehand at the initial value $X_0$ of the pseudo-random number generator 11 and generates a cryptographically secure pseudo-random number stream 7 ($b_1$, $b_2$, . . . , $b_{12}$). In the event that n is 512 bits, the pseudo-random number sequences $b_i$ (i=1, 2, ..., 12) obtained by one step of squaring calculations are each pseudo-random number sequences of 9 bits. The obtained pseudo-random number sequences $b_1, b_2, \ldots, b_{12}$ are divided into block cipher key bit lengths (54 bits) from the beginning by means of the computing device 12 (each being represented as $k_1, k_2, \ldots$), and these are sequentially used as the block cipher keys 8. At the block encrypting device 3, the first ten encrypted blocks from A are deciphered using key $k_1$, the next five encrypted blocks are deciphered using key $k_2$, thus obtaining the plain text block stream (communication text).

(3) A reads the internal variable value $x_{12}$ ($=x_0\hat{}2\hat{}12$ mod N) of the pseudo-random number generating device 11 at the time of completing encryption of the last plain text block stream 5, and stores it in the holding unit 9 as the new key (initial value for the pseudo-random number generating device) $K_{AB}$ for subsequent encrypted communication with B.

(4) B reads the internal variable value $x_{12}$ ($=x_o\hat{}2\hat{}12$ mod N) of the pseudo-random number generating device 11 at the time of completing encryption, and stores it in the holding unit 9 as the new key (initial value for the pseudo-random number generator) $K_{AB}$ for subsequent encrypted communication with A.

As described above, according to these procedures, the initial value input to the pseudo-random number generating device 11 is changed even if the other party with which communication is being made is the same party each time, the same key stream is not generated as an initial value from the pseudo-random number generating device 11, hence the encrypted text is encrypted with a different key stream even if the other party to which the encrypted text is being sent is the same party each time, consequently improving the safety of the block cipher. Also, it can be understood that according to the present embodiment, the keys changed each time communication are cryptographically secure pseudo-random numbers using square-type random numbers, and that communication for updating the encryption key is unnecessary.

<Fifth Example of Encrypted Communication>

Figure 13A:
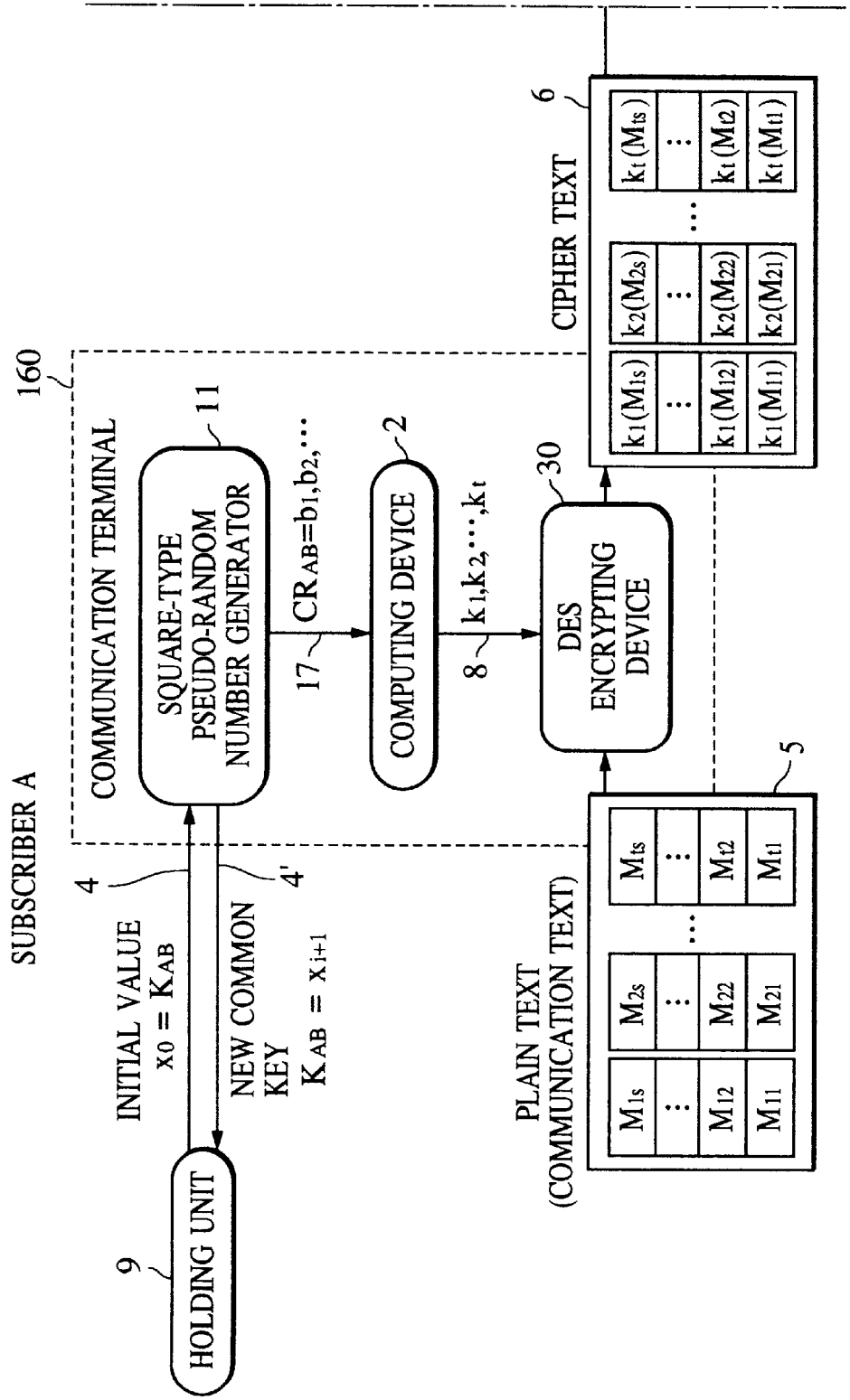
FIG. 13, consisting of FIGS. 13A and 13B, is a diagram describing encrypted communication using a square-type pseudo-random number generator and DES encryption.

The present example is described with reference to an instance in which DES cipher is used as the block cipher algorithm, and square-type pseudo-random numbers are used as the algorithm for generating cryptographically secure pseudo-random numbers, as shown in FIG. 13. In order to make the square-type pseudo-random numbers sufficiently safe, the number of bits n of the modulo N of squaring calculation (Expression (1)) shall be set at 512. Further, as shown in FIG. 13, the pseudo-random number $CR_{AB}$ generated thereby is converted into a DES cipher key stream $k_1, k_2, \ldots$. According to the present embodiment, the computing device 2 divides the obtained pseudo-random number $CR_{AB}$ into DES cipher key 8 bit lengths (54 bits) from the beginning, and processing is performed to make each of these into $k_1, k_2, \ldots, (k_u: 1, 2, \ldots$ each being 56 bits). Also, an s number of blocks from $M_{u1}$ to $M_{us}$ of the plain text block stream 5 is encrypted using the DES encrypting device 30 using the same key $k_i$. Also, the keys (initial value of the pseudo-random number generator) $K_{AB}$, $K_{AC}, \ldots$ secretly shared between the subscribers beforehand are such that $1 < K_{AB}, K_{AC}, \ldots < N-1$.

Procedures for encrypted communication from subscriber A to B according to the present embodiment will now be described.

(1) A sets the secret key $K_{AB}$ which is shared with the destination B beforehand at the initial value $X_0$ of the pseudo-random number generator 11 and operates the pseudo-random number generator 11, thereby generating a cryptographically secure pseudo-random number stream 7 ($CR_{AB} = b_1, b_2, \ldots$). In the event that n is 512 bits, the pseudo-random number sequences $b_i$ (i=1, 2, ...) obtained by one step of squaring calculations are each pseudo-random number sequences of 9 bits. The obtained pseudo-random number sequence $CR_{AB}$ is divided into DES cipher key bit lengths (56 bits) from the beginning by means of the computing device 2 (each being represented as $k_1, k_2, \ldots$), and these are sequentially used as the block cipher keys 8. At the DES encrypting device 30, the first s number of plain text blocks are encrypted using the key $k_1$, the next s number of plain text blocks are encrypted using key $k_2$, and the encrypted cipher text block stream 6 is sent to B.

(2) B sets the secret key $K_{AB}$ which is shared with the sender A beforehand at the initial value $X_0$ of the pseudo-random number generator 11 and operates the pseudo-random number generator 11, thereby generating a cryptographically secure pseudo-random number stream 7 ($CR_{AB}$= $b_1, b_2, \ldots$). In the event that n is 512 bits, the pseudo-random number sequences $b_i$ (i=1, 2, ...) obtained by one step of squaring calculations are each pseudo-random number sequences of 9 bits. The obtained pseudo-random number sequence $CR_{AB}$ is divided into DES cipher key bit lengths (56 bits) from the beginning by means of the computing device 2 (each being represented as $k_1, k_2, \ldots$), and these are sequentially used as the block cipher keys 8. At the DES encrypting device 30, the first s number of cipher text blocks are deciphered using the key $k_1$, the next s number of cipher text blocks are deciphered using key $k_2$, so on until the last cipher text block, thus obtaining the communication text.

(3) A reads the internal variable value $x_{i+1}$ ($=x_0\hat{}2\hat{}(i+1)$ mod N) of the pseudo-random number generator 11 at the time of completing encryption of the last plain text block stream 5, and stores it in the holding unit 9 as the new key (initial value 4' for the pseudo-random number generating device) $K_{AB}$ for subsequent encrypted communication with B. In the event that s is "10", and that the communication text to be encrypted is divided into "15" plain text blocks, two encryption keys, $k_1$ and $k_2$ are necessary. The two combined encryption keys $k_1$ and $k_2$ total 112 bits, so there is the need to perform squaring calculation 13 times (13 (times)×9 (bits/time)=117 (bits)>112 (bits)). In this case, the internal variable of the pseudo-random number generator 11 at the time of completing encryption is $x_{13}$ ($=x_0\hat{}2\hat{}13$ mod N), and this is stored in the holding unit 9 as the new key $K_{AB}$ for subsequent encrypted communication with B.

(4) B reads the internal variable value $x_{i+1}$ ($=x_0\hat{}2\hat{}(i+1)$ mod N) of the pseudo-random number generator 11 at the time of completing encryption of the communication text, and stores it in the holding unit 9 as the new key (initial value 4' for the pseudo-random number generating device 11) $K_{AB}$ for subsequent encrypted communication with A.

According to these procedures, the same key stream is not generated as an initial value from the pseudo-random number generator 11 even if the other party with which communication is being made is the same party each time, and the communication text is encrypted with a different key stream even if the other party to which the encrypted text is being sent is the same party each time, consequently improving the safety of the block cipher.

In the above procedures (1) and (2), the obtained pseudo-random number sequence $CR_{AB} = b_1, b_2, \ldots$ is divided into DES cipher key bit lengths (56 bits) from the beginning by means of the computing device 2 (each being represented as $k_1, k_2, \ldots$), and these are sequentially used as the block cipher keys. However, any means may be used for converting $CR_{AB}$ into DES cipher keys, so long as the means is shared on the network which performs encrypted communication.

Also, as illustrated in the example of procedure (3), the number of bits generated by the pseudo-random number generator 11 (117 bits) is greater than the number of bits actually used as the encryption keys $k_1$, $k_2$ (112 bits), meaning that there are extra pseudo-random numbers. Processing of the extra pseudo-random numbers may be carried out in any way, so long as the means is shared on the network. For example, there is a method wherein the extra pseudo-random numbers are discarded. Or, instead of discarding the extra pseudo-random numbers, these may be secretly stored and used as a part of the pseudo-random number necessary for communication with the same party the next time. Also, the number of bits of the modulo N of squaring calculation was described as being 512 bits, but any number of bits may be used as long as cryptographically secure. Further, in the procedures (3) and (4), the new key $K_{AB}$ may be made to be such that the internal variable is further subjected to an h number (h being an integer) of squaring calculations following encryption to yield the internal variable $x_{i+1+h}$, so as to be a new key $K_{AB}$ with which subsequent communication is carried out.

Also, DES cipher was used as the block cipher in the present embodiment, but anything can be used so long as it is a shared-key cipher, such as FEAL cipher.

Also, one DES encrypting device 30 was used as the block encrypting device 3, but a plurality of DES encrypting devices or a combination of DES cipher and FEAL cipher may be used, instead. Further, square-type pseudo-random numbers are described for the cryptographically secure pseudo-random number generating algorithm, but any cryptographically secure pseudo-random number generating algorithm may be used, so pseudo-random number generating algorithms using RSA ciphers, discreet logarithms, inverse number ciphers, etc., may be used.

<Example of Combining the First and Second Embodiments>

The present embodiment will be with the block cipher key changing cycle in the second embodiment made to be the same as that in the first embodiment. In the above second embodiment, the pseudo-random number sequence $CR_{AB}$ is divided into block cipher key bit lengths from the beginning by means of the computing device 12 (each being represented as $k_1, k_2, \ldots$), these being sequentially used as the block cipher keys. However, any method may be used for the method described in the second embodiment for converting $CR_{AB}$ into DES cipher, so long as the method is shared on the network conducting encrypted communication, so an example will be illustrated in which the block cipher key changing cycle is sped up in the same manner as with the first embodiment.

In the above second embodiment, updating of the block cipher key was not performed until the number of bits of pseudo-random numbers output from the pseudo-random number generator 11 becomes equal to the number of bits of the block cipher key. In other words, in the event that j bits of pseudo-random numbers are output from the pseudo-random number generator 11 each time, and in the case that the size of the block cipher key is m×j bits, the key is updated each time pseudo-random numbers have been output m times. Conversely, with the present embodiment, key is updated each time pseudo-random numbers are output from the pseudo-random number generator 11. Accordingly, the updating cycle of the block cipher is shortened by 1/m, thereby facilitating improved safety of the block cipher.

Figure 14:
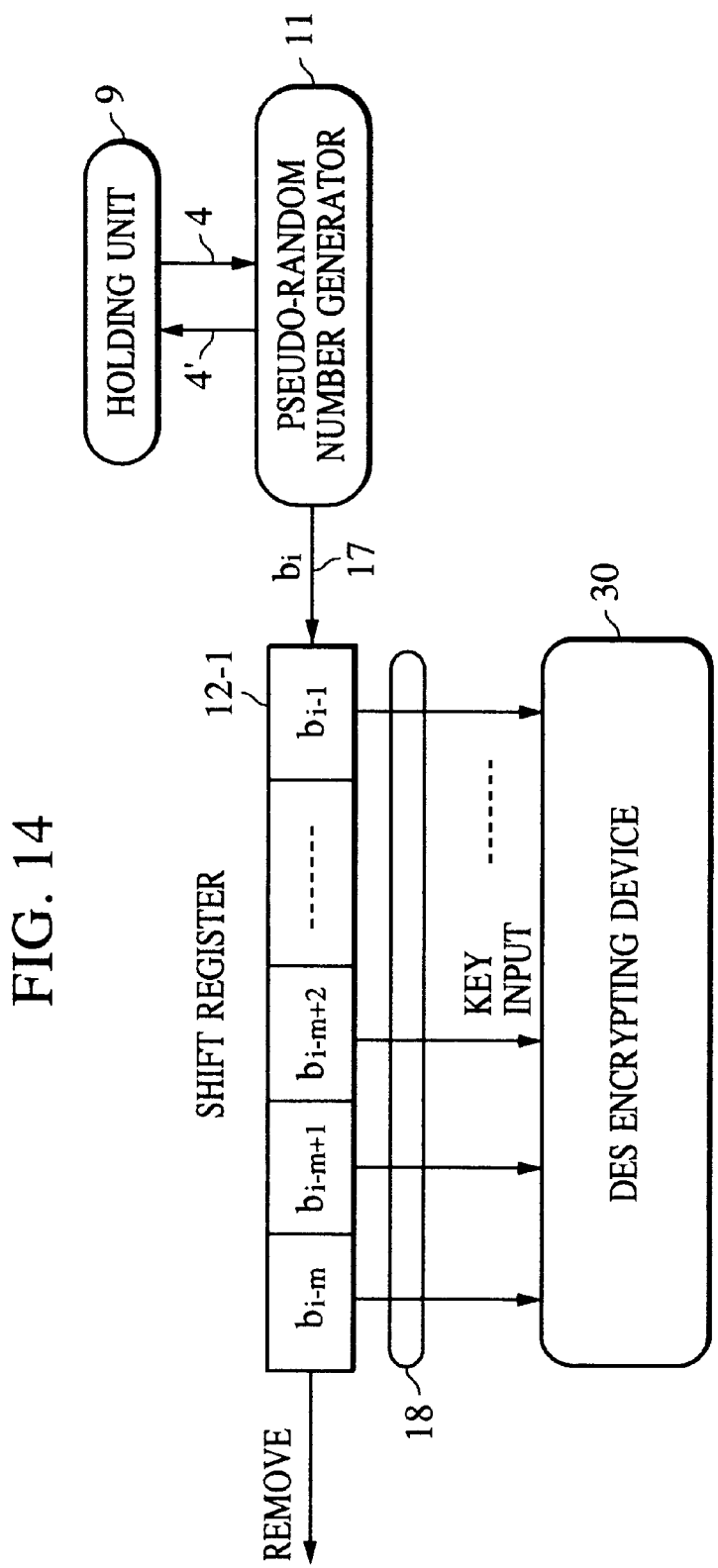
FIG. 14 is a diagram illustrating an example of a computing device combining a pseudo-random number generator and a shift register.

An example of the construction of the present embodiment is shown in FIG. 14. Here, as with FIG. 5, the computing device 12 is realized by using a shift register 12-1. The block cipher key bit stream is sequentially stored in the serial input/parallel output shift register 12-1, such that the key is input by parallel output for block cipher. In the event of updating the block cipher key from $k_k=b_{i-m}$, $b_{i-m+i}, b_{i-m+2}, \ldots, b_{i-1}$ to $k_{k+1}=b_{i-m+1}, b_{i-m+2}, \ldots, b_i$, the new pseudo-random number $b_i$ is input by being shifted j times from serial input. The leading j bits of the block cipher key $k_k$ before updating is removed from the leading register. According to such a computing device 12, the block key updating shown in the present invention can be performed.

Or, j number of serial input/parallel output shift registers 12-1 may be provided, such that each shift register is shifted once upon the j-bit $b_i$ being output from the pseudo-random number generator 11 so as to input one bit to each of the shift registers 12-1, thereby performing the processing of the computing device 12.

Even with a cryptosystem using such a key updating method, the internal variable value of the pseudo-random number generator 11 at the time of completing encryption of the communication text is stored in secret as the new -key (initial value for the pseudo-random number generator 11) for subsequent encrypted communication with the same party, thereby enabling changing the block cipher key sequence each time communication is made.

Third Embodiment

The above-described second embodiment updates the communication initiation setting value each time encryption processes are carried out, thereby converting the plain text such that even in the event the same plain text is encrypted several times, the cipher text differs each time, thus improving safety.

However, there is a problem in that in the event that a plurality of pieces of information sent with encrypted communication are to be saved in the state of being encrypted, the communication initiation setting value is different for each communication, so the communication initiation setting value cannot be determined for saved encrypted information.

For example, let us consider a case in which encrypted communication is conducted twice between subscribers A and B according to the above method. With the communication text for the first encrypted communication as $M_{first}$, and the cipher text thereof as $C_{first}$, and with the communication text for the second encrypted communication as $M_{second}$, and the cipher text thereof as $C_{second}$, communication is carried out with the communication initiation setting value being $K_{AB}=X_0$ for the first encrypted communication and with the communication initiation setting value being $K_{AB}=x_{i+1}$ for the second encrypted communication.

In the event that B receives both cipher texts $C_{first}$ and $C_{second}$, B cannot tell which has been encrypted with the communication initiation setting value $K_{AB}=x_0$. Further, even if B can tell that the communication initiation setting value for $C_{first}$ is $K_{AB}=x_0$ due to the order or arrival or such, in the event that B desires to directly decipher $C_{second}$ before deciphering $C_{first}$, the following procedures are necessary in order to identify $xi+_1$:

(1) The size of $C_{first}$ is found, and calculation is made of how many block cipher blocks it consists of.

(2) Calculation is made to determine how many times the feedback calculation of Expression (1) must be made in order to encrypt the number of blocks obtained in step (1).

(3) With communication initiation setting value of $K_{AB}=x_0$ as the initial value, the feedback calculation of Expression (1) is performed according to the number of times calculated in step (2).

(4) $C_{second}$ is deciphered with the internal variable $x_{i+1}$ at the time of completing step (3) as the communication initiation setting value for $C_{second}$.

Further, in the event that $C_{first}$ vanishes during the communication, or in the event that the order of $C_{first}$ and $C_{second}$ arriving is inverted, deciphering cannot be carried out properly.

Accordingly, the third embodiment attempts to solve these problems.

The essence of the present embodiment is that the information regarding the number of times of feedback (FB) calculations is sent with the corresponding cipher text in order to match the cipher text and the communication initiation setting value in a one-on-one manner, so that the information regarding the number of times of feedback (FB) calculations attached to the cipher text is referred to before deciphering, thereby enabling a plurality of cipher texts to be deciphered in a random order without performing the troublesome procedures necessary with the prior art. Now, the number of times that feedback calculation of Expression (1) is performed to the initial setting value in order to obtain the communication initiation setting value shall be referred to as "FB calculation times", and the information thereof shall be referred to as "FB calculation times information". The initial setting value for the first encrypted communication is the communication initiation setting value, and therefore "FB calculation times" is "0".

Figure 15:
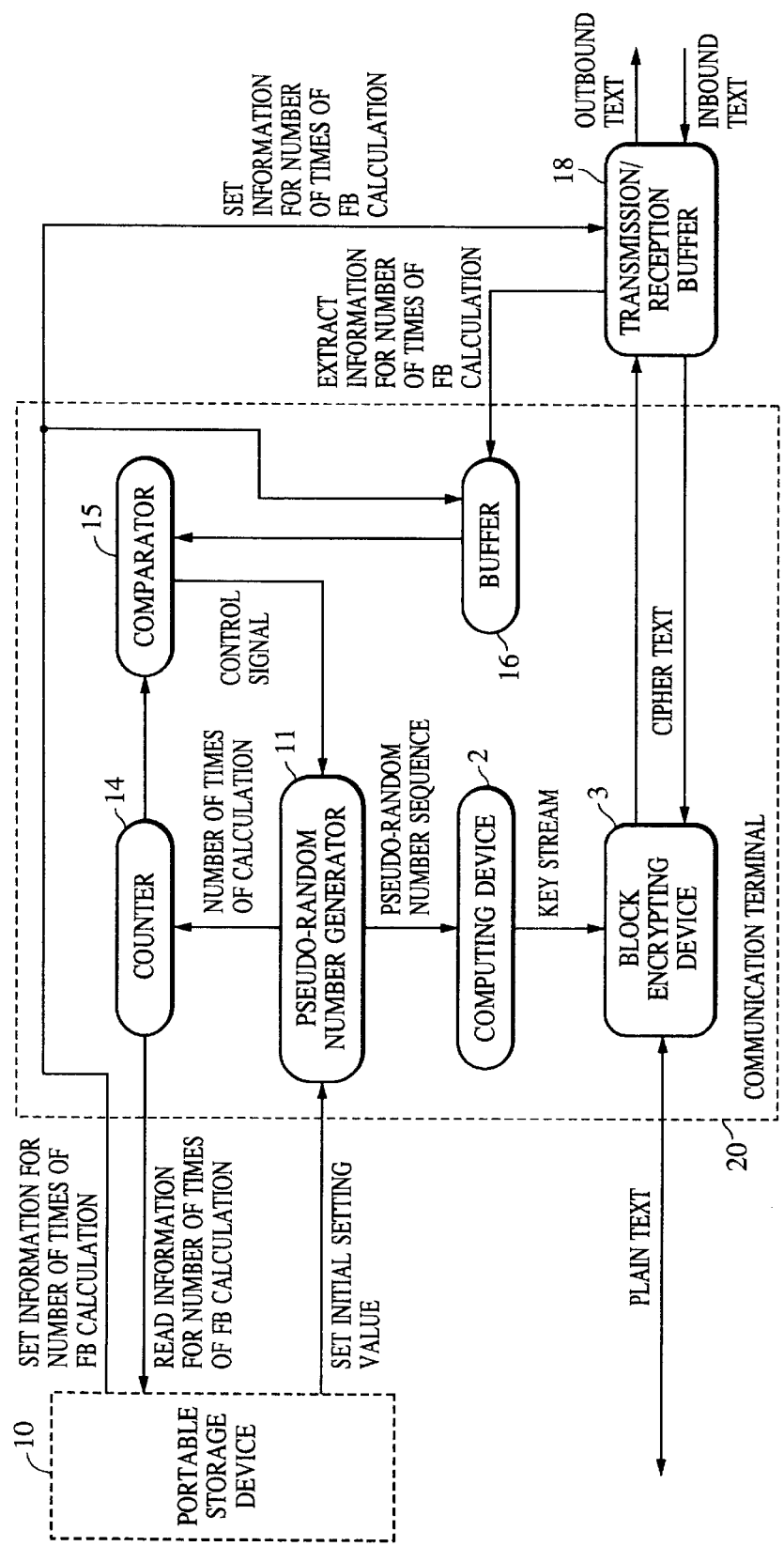
FIG. 15 is a diagram illustrating an example of configuration of the communication terminal according to a third embodiment.

In the third embodiment, as is shown in FIG. 15, encrypted communication is performed using a communication terminal 20 comprising; a block encryption device 3 for performing encryption (deciphering) following an algorithm stipulated on the network; a pseudo-random number generator 11 for generating cryptographically secure pseudo-random numbers following an algorithm stipulated on the network; a computing device 2 for converting the pseudo-random numbers output from the pseudo-random number generator 11 into a key stream for the block encryption device 3; a counter 14 for counting "FB calculation times", a buffer 16 for holding "FB calculation times information" extracted from a portion of the received text, and a comparator which compares the value of the buffer 16 with the value of the counter 14 and sends a control signal to the pseudo-random number generator 11 in the event that there is a match.

The pseudo-random number generator 11 is capable of reading out the number of times that the feedback calculation necessary for generating pseudo-random numbers has been performed, and can hold the read out value in the counter 14. As for the block encryption device 3 and computing device 2, that described with reference to known art may be used without alterations. Known items may be used for the buffer 16 and comparator 15 as well, in realizing the present invention.

The encrypted communication network shown in FIG. 3 will be taken into consideration. A, B, C, . . . , N represent network subscribers, $K_{AB}$ is a key shared between the subscribers A and B, $K_{AC}$ is a key shared between the subscribers A and C, and so forth. Sharing of the key can be realized either by the network administrator or the like setting the key, or by a known key sharing method.

Figure 16:
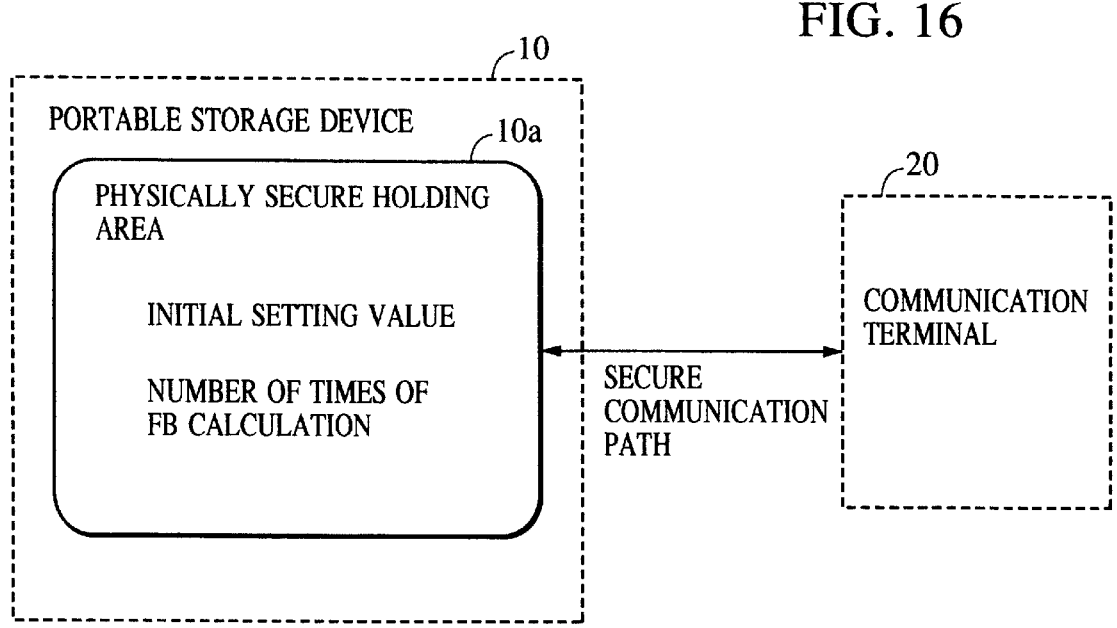
FIG. 16 is a diagram illustrating an example of the portable storage device according to the third embodiment.

It is preferable that the encrypted communication network subscribers each have a portable storage device 10 such as shown in FIG. 16. Stored in the portable storage device 10 is secret information for each user that is necessary for encrypted communication as described below, the configuration being such that each user has the portable storage device 10 separately from the communication terminal, for safety reasons. A portable storage device 10 regarding which physical safety can be secured for each user may comprise a portion of the communication terminal, but in such a case, the communication terminal usable by each user for encrypted communication is undesirably limited. Separating the communication terminal and the portable storage device so that the communication terminal does not store the secret information of each user allows the users to exchange secret user information via the portable storage devices for each user, thus enabling encrypted communication in an advantageous manner.

The portable storage device 10 is capable of exchanging information via the above communication terminal and safe communication channels, and has a physically safe holding area 10a. Only an authorized owner can properly operate the portable storage device 10, judgment being made whether the operator is the authorized owner or not by means of a password or the like. The portable storage device 10 is capable of exchanging "FB calculation times information" in the counter 14 with the communication terminal, and is arranged so as to be able to hold this information in the above-described holding area 10a. Also, of the above keys, such relating to the owner of the portable storage device 10 is held in the holding area 10a as initial setting value as to the other parties with which communication is to be made. The portable storage device 10 can be realized by an IC card or the like.

In the third embodiment, DES cipher will be described as the block cipher algorithm, with reference to a case in which square-type pseudo-random numbers are uses as the algorithm for generating the pseudo-random numbers secure from a computational complexity perspective. The DES cipher is a shared-key block cipher with a 64-bit block length, and having a 56-bit key.

Figure 17:
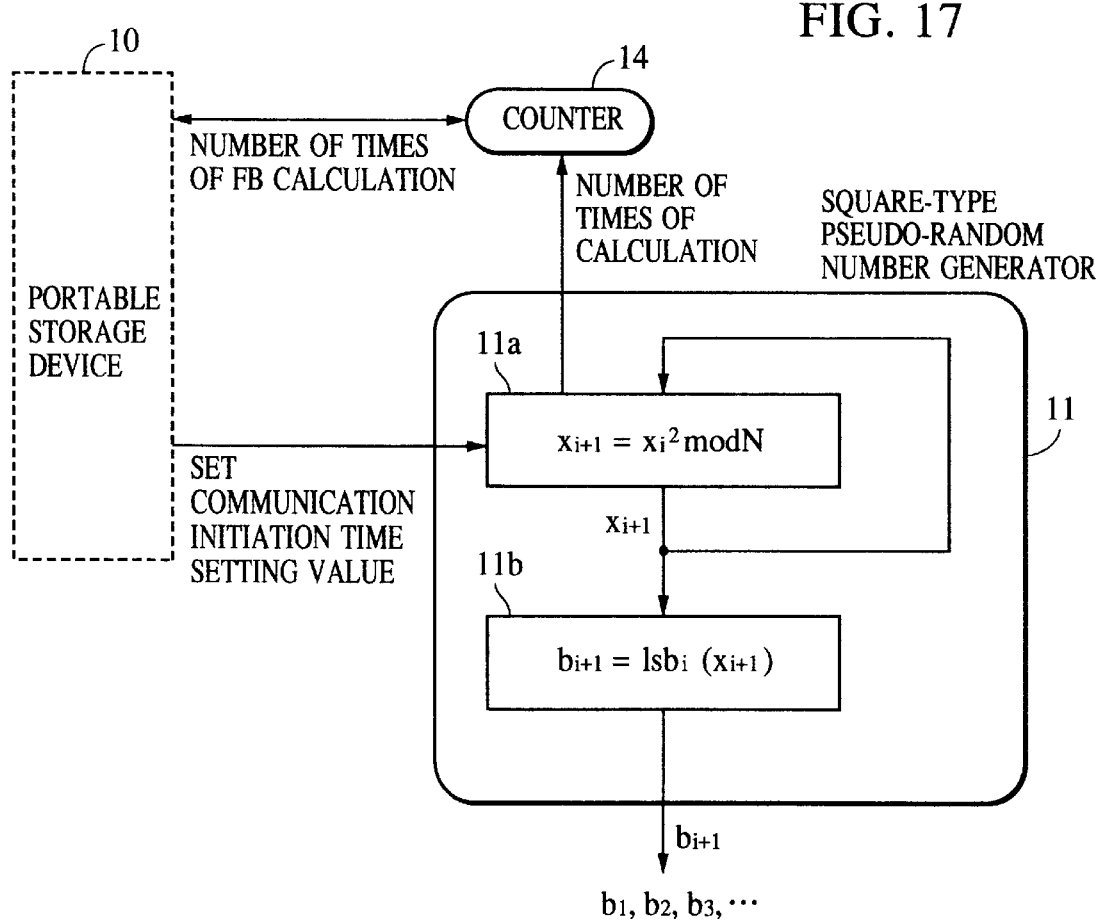
FIG. 17 is a diagram illustrating an example of the pseudo-random number generator according to the third embodiment.

The pseudo-random number generator for generating the square-type pseudo-random numbers is shown in FIG. 17.

In FIG. 17, the internal variable value $x_{i+1}$ does not need to be read. Also, the provided counter 14 is capable of counting how many times the Expression (3) has been calculated with the pseudo-random number generator while plain text (or cipher text) is being encrypted (or deciphered). In order to make the square-type pseudo-random numbers sufficiently safe, the number of bits n of the modulo N of squaring calculation Expression (3) shall be set at 512. Further, the keys (initial value of the pseudo-random number generator) $K_{AB}$, $K_{AC}$, . . . secretly shared between the subscribers beforehand are such that $1<K_{AB}, K_{AC}, \ldots <N-1$.

Communication from subscriber A to B in the third embodiment is performed according to the following procedures. Let us say that the "FB calculation times information" which the subscriber A holds in the portable storage device 10 is "m", and the volume of information transmitted at this time is such which has the size necessary for performing feedback calculation of the expression (1) i times in order to perform this encrypted communication. Also, in the following description, it is assumed that the portable storage device 10 has certified the authorized user, and that the portable storage device 10 is in an operable state and is set so as to communicate with the inside of the communication terminal 20.

[Procedures for Transmission of Cipher Text by the Sender A]

(1) The secret key (initial setting value) $K_{AB}$ which is held within the portable storage device 10 and is shared with the destination B beforehand is set to the pseudo-random number generator 11 within the communication terminal as the communication initiation setting value $X_0$.

(2) The "FB calculation times information" regarding the destination B which is held in the portable storage device 10 as "m" is stored in the buffer 16. Further, the "FB calculation times information m" is also sent to the transmission/reception buffer 17.

(3) The counter 14 of the communication terminal is set to "0".

(4) The pseudo-random number generator 11 is operated, and calculation of the Expression (3) is performed m times until the value of the counter 14 is equal to the value m of the buffer 16 (i.e., the number of times equal to the value of the received "FB calculation times information"). Whether the values are equal or not can be known by comparing the value of the counter 14 with the value of the buffer 16 using the comparator 15. Once the values are equal, the comparator 15 sends a control signal to the pseudo-random number generator 11, notifying such. It should be noted, however, that the pseudo-random number sequence generated with this calculation is discarded. The counter 14 of the communication terminal points to m at this time.

(5) The pseudo-random number generator 11 which has received the control signal is set with the internal variable $x_m$ after performing of the Expression (3) for m times as the communication initiation setting value, and the pseudo-random number generator 11 is further operated to generate cryptographically secure pseudo-random numbers.

(6) The pseudo-random number sequence generated by the computing device 2 is converted into a block cipher key stream.

(7) Using the key stream output from the computing device 2 as the block cipher key while continuously updating, the plain text is converted into cipher text by the block encrypting device 3. At the end of encryption, the counter 14 of the communication terminal has been incremented to m+i.

(8) The communication terminal sends the cipher text and the "FB calculation times information m" in the reception/transmission buffer 17 to B.

(9) The value m+1 of the counter 14 at the end of encryption is secretly held in the holding area 10a of the portable storage device 10 to be used as the new "FB calculation times information" for subsequent communication with B.

[Procedures for Reception of Cipher Text by the Receiver B]

(1) The sent cipher text and the "FB calculation times information m" corresponding to the cipher text are received, and the "FB calculation times information m" is stored in the buffer 16.

(2) The secret key (initial setting value) $K_{AB}$ which is held within the portable storage device 10 and is shared with the sender A beforehand is set to the pseudo-random number generator 11 within the communication terminal as the communication initiation setting value $X_0$.

(3) The counter 14 of the communication terminal is set to "0".

(4) The pseudo-random number generator 11 is operated, and calculation of the Expression (3) is performed m times until the value of the counter 14 is equal to the value m of the buffer 16 (i.e., the number of times equal to the value of the received "FB calculation times information"). Whether the values are equal or not can be known by comparing the value of the counter 14 with the value of the buffer 16 using the comparator 15. Once the values are equal, the comparator 15 sends a control signal to the pseudo-random number generator 11, notifying such. It should be noted, however, that the pseudo-random number sequence generated with this calculation is discarded. The counter 14 of the communication terminal points to m at this time.

(5) The pseudo-random number generator 11 which has received the control signal is set with the internal variable $x_m$ after performing of the Expression (3) for m times as the communication initiation setting value, and the pseudo-random number generator 11 is further operated to generate cryptographically secure pseudo-random numbers.

(6) The pseudo-random number sequence generated by the computing device 2 is converted into a block cipher key stream.

(7) Using the key stream output from the computing device 2 as the block cipher key while continuously updating, the plain text is converted into cipher text by the block encrypting device 3. At the end of encryption, the counter 14 of the communication terminal has been incremented to m+i.

(8) The value m+1 of the counter 14 at the end of encryption is secretly held in the holding area 10a of the portable storage device 10 to be used as the new "FB calculation times information" for subsequent communication with A.

According to these procedures, the cipher text and the communication initiation setting value can be correlated in a one-on-one manner. To that end, with these procedures, information regarding how many times the feedback calculation of Expression (3) must be made to the initial setting value is sent with the corresponding cipher text (i.e., "FB calculation times information"). The receiver of the cipher text receives the "FB calculation times information" which has been sent with the corresponding cipher text, and is able to obtain a communication initiation setting value uniquely corresponding with the cipher text, by means of performing the certain number of feed back calculations to the initial setting value. According to such an arrangement, encryption can be carried out without problem even in the event that the receiver has received a plurality of cipher texts, and deciphering in random order is possible, as well. For example, even in the event that a cipher text encrypted later (referred to as "$C_{second}$") than an earlier-encrypted cipher text (referred to as "$C_{first}$") arrives at B first, deciphering can be made in the order of $C_{second}$, $C_{first}$, with no problem whatsoever. Also, in the event that $C_{first}$ does not reach B due to vanishment along the communication path or so forth, B is capable of deciphering $C_{second}$ with no problem whatsoever.

FIG. 15 shows a method for realizing sending of the cipher text and the "FB calculation times information" corresponding with the cipher text, in which a function is provided to the reception/transmission buffer 17 connected to the communication terminal 20 wherein the "FB calculation times information" corresponding to the cipher text is inserted in the cipher text upon sending of the cipher text, and the "FB calculation times information" corresponding to the cipher text is extracted from the cipher text upon receiving of the cipher text. In this case, e.g., a rule is made on the network beforehand that the first certain number of bits of the communication text is to hold "FB calculation times information", such that the sender sends transmission text with the "FB calculation times information" inserted in the position of the first certain number of bits, and the receiver extracts the "FB calculation times information" from the position of the certain number of bits, thereby sharing the "FB calculation times information" regarding the cipher text between the sender and receiver.

In the above procedures, the reason in procedure (8) of the receiver that the value of the counter 14 is held in the holding area 10a is that the receiver may be the sender the next time that communication is made. Some terminals may never be senders in encrypted communication, and always serve as receivers; in the case that such is known to be true, the above procedure (8) is unnecessary for that terminal.

Regarding the above procedure (6) of the sender and procedure (6) of the receiver, there is a method for converting the obtained pseudo-random number sequence into a DES cipher key stream with the computing device 2, in that the pseudo-random number sequence is divided into DES cipher key bit lengths (56 bits), which then are sequentially used as DES cipher keys. Other methods for converting the obtained pseudo-random number sequence into a DES cipher key stream with the computing device 2 can be used regardless of the method, so long as the method is shared on a network which performs encrypted communication. Also, even if the method is not shared on the entire network which performs encrypted communication, it will work as long as it is shared between the sender and the receiver.

The number of blocks to be encrypted (deciphered) by one key may be any number so long as the number is shared on a network which performs encrypted communication. Also, even if the number is not shared on the entire network which performs encrypted communication, it will work as long as it is shared between the sender and the receiver. Also, $b_i$ can use a bit number determined by the Expression (4). Also, the number of bits of the modulo N of squaring calculation was described as being 512 bits, but any number of bits may be used as long as secure from a perspective of complexity of calculation.

Also, in the present embodiment, although DES numbers were used as the block cipher, this is not limited to DES cipher; rather, any shared-key cipher can be used, such as FEAL cipher. Further, one DES encrypting device was used as the block encrypting device 3, but a plurality of DES encrypting devices or a combination of DES cipher and FEAL cipher may be used, instead. Further, square-type pseudo-random numbers are described for the calculation-volume secure pseudo-random number generating algorithm, but any computationaly secure pseudo-random number generating algorithm may be used, so pseudo-random number generating algorithms using RSA ciphers, discreet logarithms, inverse number ciphers, etc., may be used.

Fourth Embodiment

Figure 18:
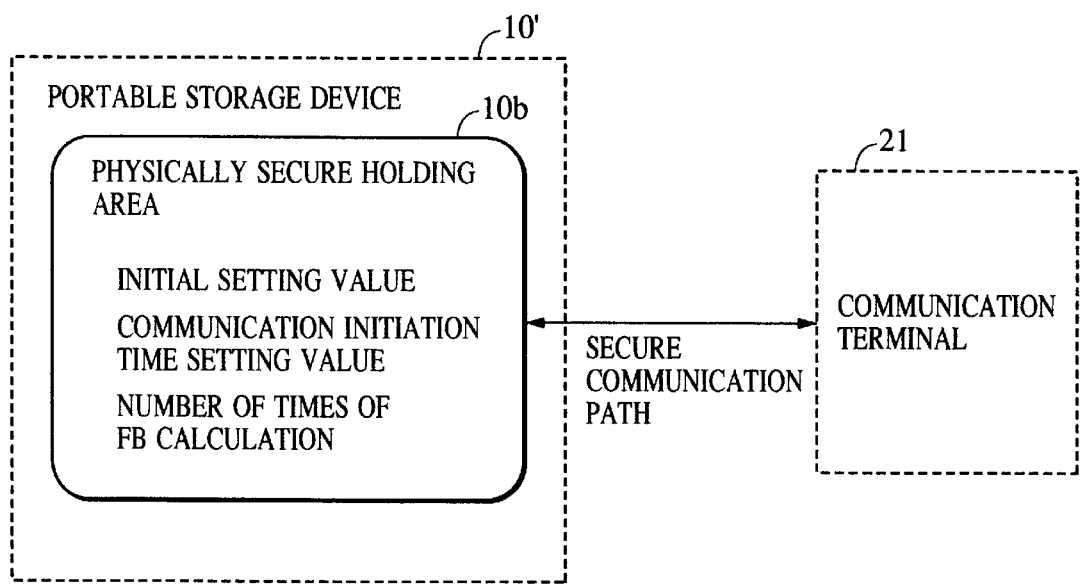
FIG. 18 is a diagram illustrating an example of the portable storage device according to a fourth embodiment.

In the fourth embodiment, each subscriber has a portable storage device 10' such as shown in FIG. 18. The portable storage device 10' shown in FIG. 18 is capable of exchanging the internal variable value of the pseudo-random number generating device 11' and "FB calculation times information" in the counter 14 with the communication terminal 21, and holding the information in the holding area 10b. The point of difference with the portable storage device 10 shown in FIG. 16 is that not only the "FB calculation times information" but also the internal variable value of the pseudo-random number generator 11' can be held as a new communication initiation setting value for subsequent communication.

Figure 19:
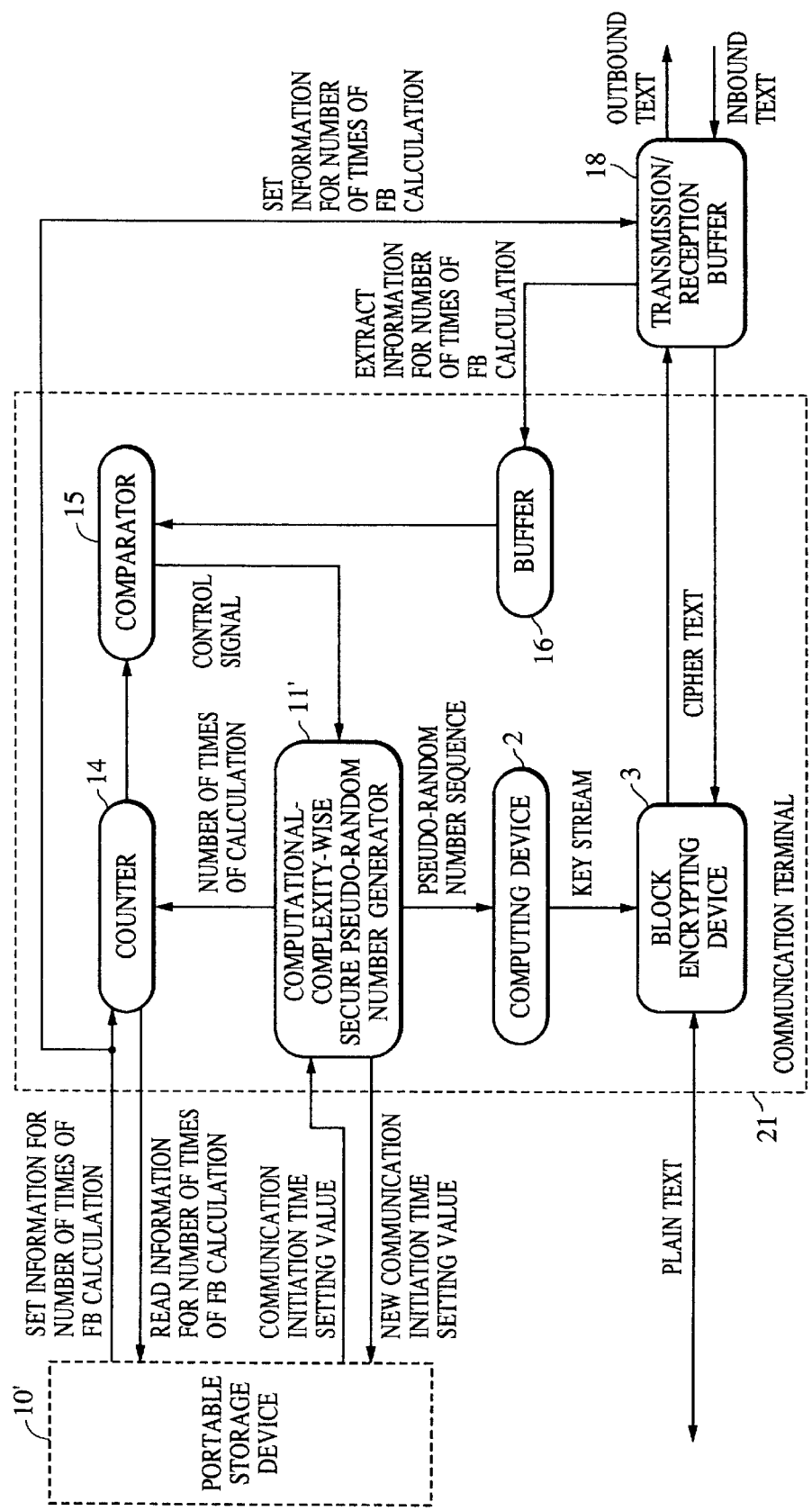
FIG. 19 is a diagram illustrating an example of configuration of the communication terminal according to the fourth embodiment.
Figure 20:
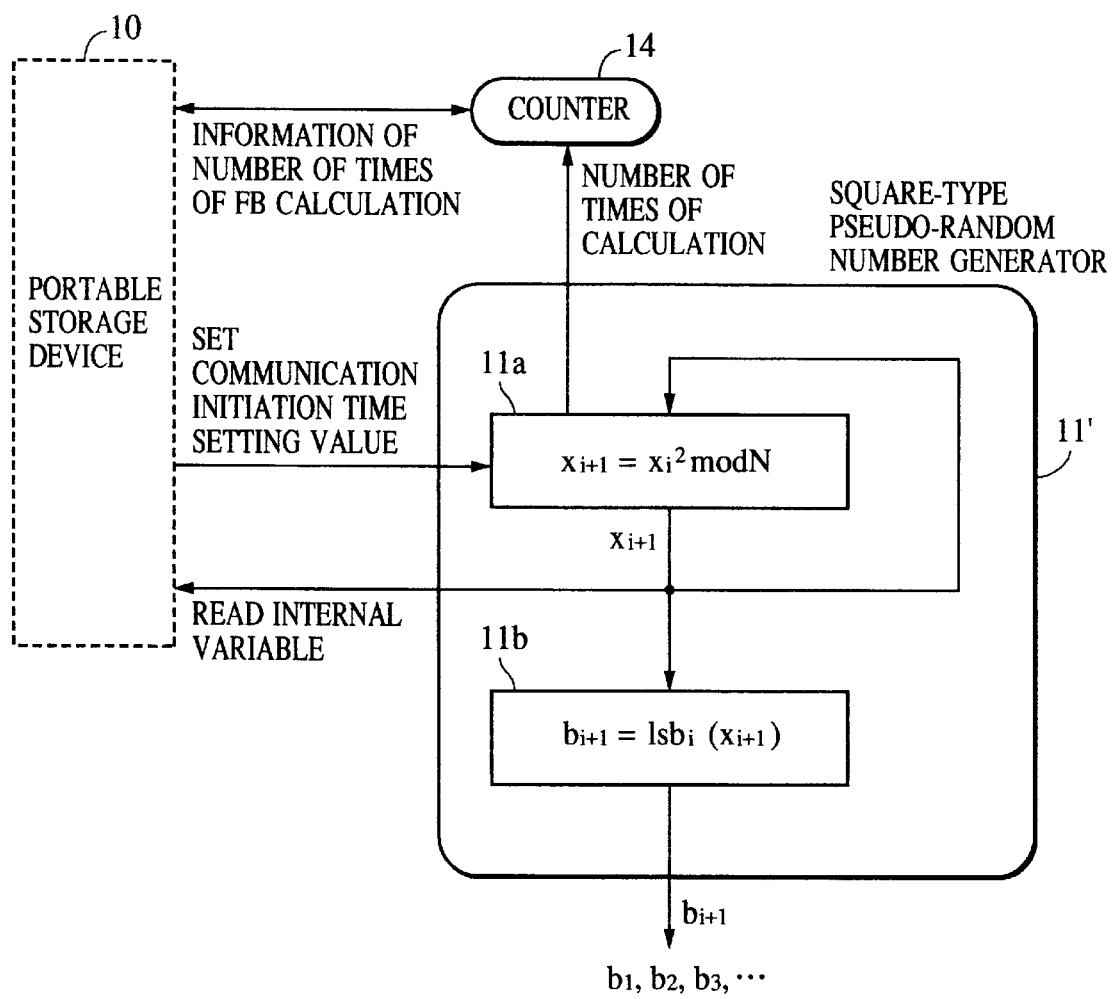
FIG. 20 is a diagram illustrating an example of the pseudo-random number generator according to the fourth and fifth embodiments.

Also, the communication terminal is such as shown in FIG. 19, and differs from the communication terminal 20 shown in FIG. 15 in that not only the "FB calculation times information" of the counter 14 but also the internal variable value of the pseudo-random number generator 11' can be exchanged with the portable storage device 10' shown in FIG. 18.

Also, the communication terminal 21 differs from the communication terminal 20 in that it is capable of reading the internal variable value of the pseudo-random number generator 11' as a new communication initiation setting value for subsequent communication. Accordingly, the pseudo-random number generator 11' for generating the square-type pseudo-random number sequence is as shown in FIG. 8.

In the fourth embodiment, as is shown in FIG. 19, encrypted communication is performed using a communication terminal 21 comprising; a block encryption device 3 for performing encryption (deciphering) following an algorithm stipulated on the network; a pseudo-random number generator 11' for generating calculation-volume secure pseudo-random numbers following an algorithm stipulated on the network; a computing device 2 for converting the pseudo-random numbers output from the pseudo-random number generator 11' into a key stream for the block encryption device 3; a counter 14 for counting "FB calculation times", a buffer 16 for holding "FB calculation times information" extracted from a portion of the received text, and a comparator 15 which compares the value of the buffer 16 with the value of the counter 14 and sends a control signal to the pseudo-random number generator 11' in the event that there is a match.

The pseudo-random number generator 11' is, as shown in FIG. 8, capable of reading out the number of times that the calculation of the Expression (3) has been performed, and can hold the read out value in the counter 14. As for the block encryption device 3 and computing device 2, that described with reference to known art may be used without alterations. Known items may be used for the buffer 16 and comparator 15 as well, in realizing the present invention. Description will be made with the network shown in FIG. 5, the same as with the first embodiment.

Although described in detail below, in the fourth embodiment, feedback calculation of the Expression (3) based on the initial setting value is not always made whenever encrypting, as with the third embodiment. Rather, feedback calculation of the Expression (3) is enabled regarding the communication initiation setting value stored in the portable storage device 10', thereby reducing the number of times that feedback calculation of the Expression (3) has to be made. However, to that end, the portable storage device 10' needs to store the communication initiation setting value for the next encrypted communication, and thus requires greater storage capacity than the portable storage device 10 described with reference to the first embodiment.

Description will be made regarding a case in which encrypted communication is made from subscriber A to subscriber B having information great enough that feedback calculation of the Expression (3) needs to be performed i times, in the same manner as with the third embodiment. Let us say that communication has already been performed between these subscribers several times, and that consequently the communication initiation setting value held in the holding area 10b of the portable storage device 10' is $x_m$, and that the "FB calculation times information" is "m". The initial setting value is fixed, and thus is $K_{AB}$. Also, in the following description, it is assumed that the portable storage device 10' has certified the authorized user, and that the portable storage device 10' is in an operable state and is set so as to communicate with the inside of the communication terminal 21.

[Procedures for Transmission of Cipher Text by the Sender A]

(1) The communication initiation setting value $X_m$ which is held within the portable storage device 10' regarding the destination B is set to the pseudo-random number generator 11' within the communication terminal.

(2) The "FB calculation times information m" regarding the destination B which is held in the portable storage device 10' is set to the counter 14. Further, the "FB calculation times information m" is also sent to the transmission/reception buffer 17.

(3) The pseudo-random number generating device 11' is operated, and calculation-volume secure pseudo-random numbers are generated.

(4) The pseudo-random number sequence generated by the computing device 2 is converted into a block cipher key stream.

(5) Using the key stream output from the computing device 2 as the block cipher key while continuously updating, the plain text is converted into cipher text by the block encrypting device 3. At the end of encryption, the counter 14 of the communication terminal has been incremented to m+i.

(6) The communication terminal sends the cipher text and the "FB calculation times information m" in the reception/transmission buffer to B.

(7) The internal variable $X_{m+i}$ of the pseudo-random number generating device 11' at the end of encryption is secretly held in the holding area 10b of the portable storage device 10' to be used as the new communication initiation setting value for subsequent communication with B.

(8) The value m+1 of the counter 14 at the end of encryption is secretly held in the holding area 10b of the portable storage device 10' to be used as the new "FB calculation times information" for subsequent communication with B.

[Procedures for Reception of Cipher Text by the Receiver B]

(1) The sent cipher text and the "FB calculation times information m" corresponding to the cipher text are received, and the "FB calculation times information m" is stored in the buffer 16.

(2) The secret key (initial setting value) $K_{AB}$ which is held within the portable storage device 10' and is shared with the sender A beforehand is set to the pseudo-random number generator 11' within the communication terminal as the communication initiation setting value $X_0$.

(3) The counter 14 of the communication terminal is set to "0".

(4) The pseudo-random number generator 11' is operated, and calculation of the Expression (3) is performed m times until the value of the counter 14 is equal to the value m of the buffer 16 (i.e., the number of times equal to the value of the received "FB calculation times information"). Whether the values are equal or not can be known by comparing the value of the counter 14 with the value of the buffer 16 using the comparator 15. Once the values are equal, the comparator 15 sends a control signal to the pseudo-random number generator 11', notifying such. It should be noted, however, that the pseudo-random number sequence generated with this calculation is discarded. The counter 14 of the communication terminal points to m at this time.

(5) The pseudo-random number generator 11' which has received the control signal is set with the internal variable $x_m$ after performing of the Expression (3) for m times as the communication initiation setting value, and the pseudo-random number generator 11' is further operated to generate cryptographically secure pseudo-random numbers.

(6) The pseudo-random number sequence generated by the computing device 2 is converted into a block cipher key stream.

(7) Using the key stream output from the computing device 2 as the block cipher key while continuously updating, the plain text is converted into cipher text by the block encrypting device 3. At the end of encryption, the counter 14 of the communication terminal has been incremented to m+i.

(8) The internal variable value $X_{m+1}$ of the pseudo-random number generator 11' at the end of encryption is secretly held in the holding area 10b of the portable storage device 10' to be used as the new communication initiation setting value for subsequent communication with A.

(9) The value m+1 of the counter 14 at the end of encryption is secretly held in the holding area 10b of the portable storage device 10' to be used as the new "FB calculation times information" for subsequent communication with A.

According to the above procedures, feedback calculation of the Expression (3) can be performed regarding the communication initiation setting value in the portable storage device 10' upon encrypting. Accordingly, the feedback calculation of the Expression (3) which had been needed to be performed for m times before actual encrypting in the communication procedure (4) for cipher text by the sender A in the first embodiment is done away with.

Fifth Embodiment

The fifth embodiment will be described with the network shown in FIG. 5, the same as with the fourth embodiment. As with the second embodiment, each subscriber has a portable storage device 10' such as shown in FIG. 18. However, the communication terminal 22 is such as shown in FIG. 21, and differs from the fourth embodiment in that it has a selector 19.

Figure 21:
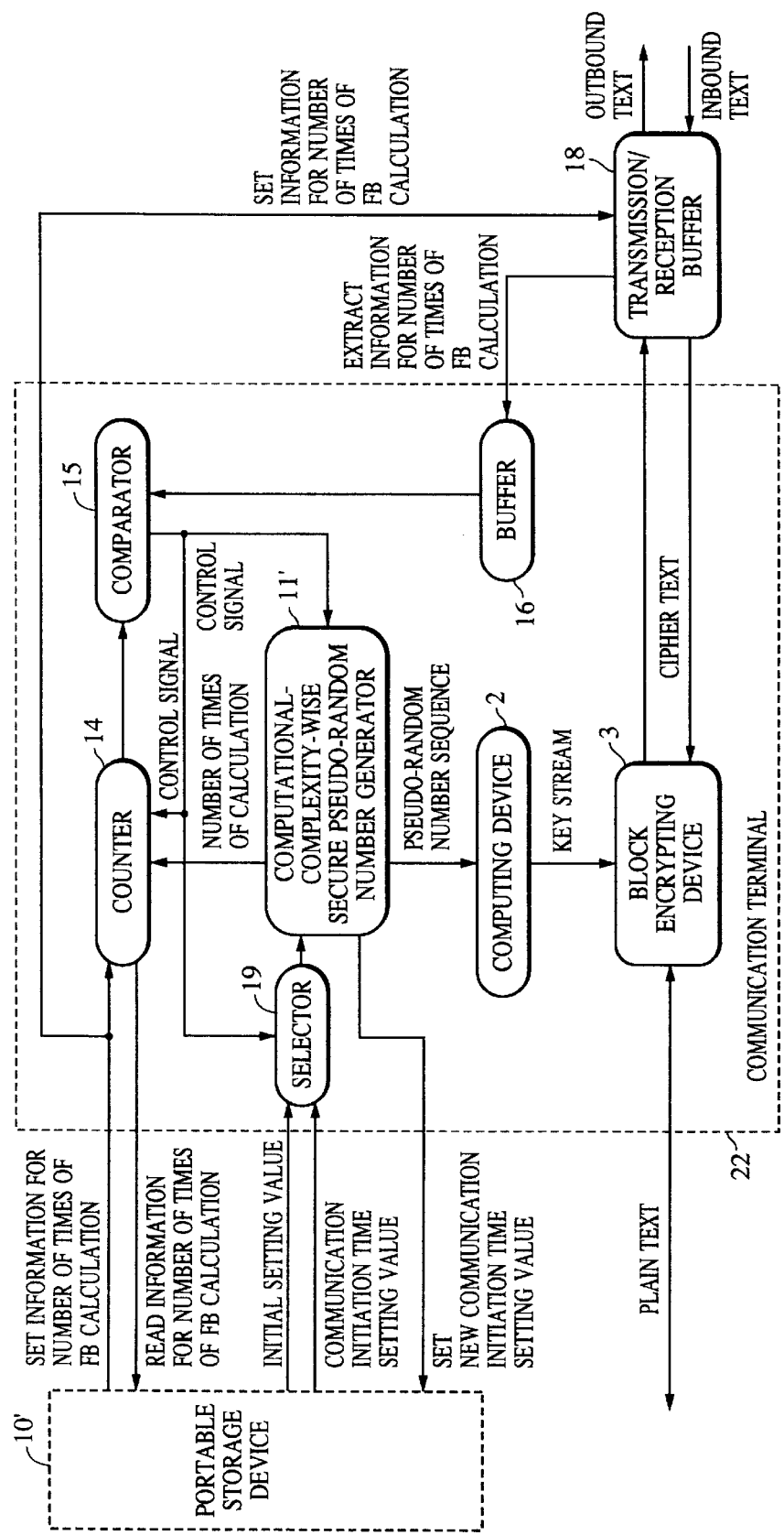
FIG. 21 is a diagram illustrating an example of configuration of the communication terminal according to the fifth embodiment.
Figure 22:
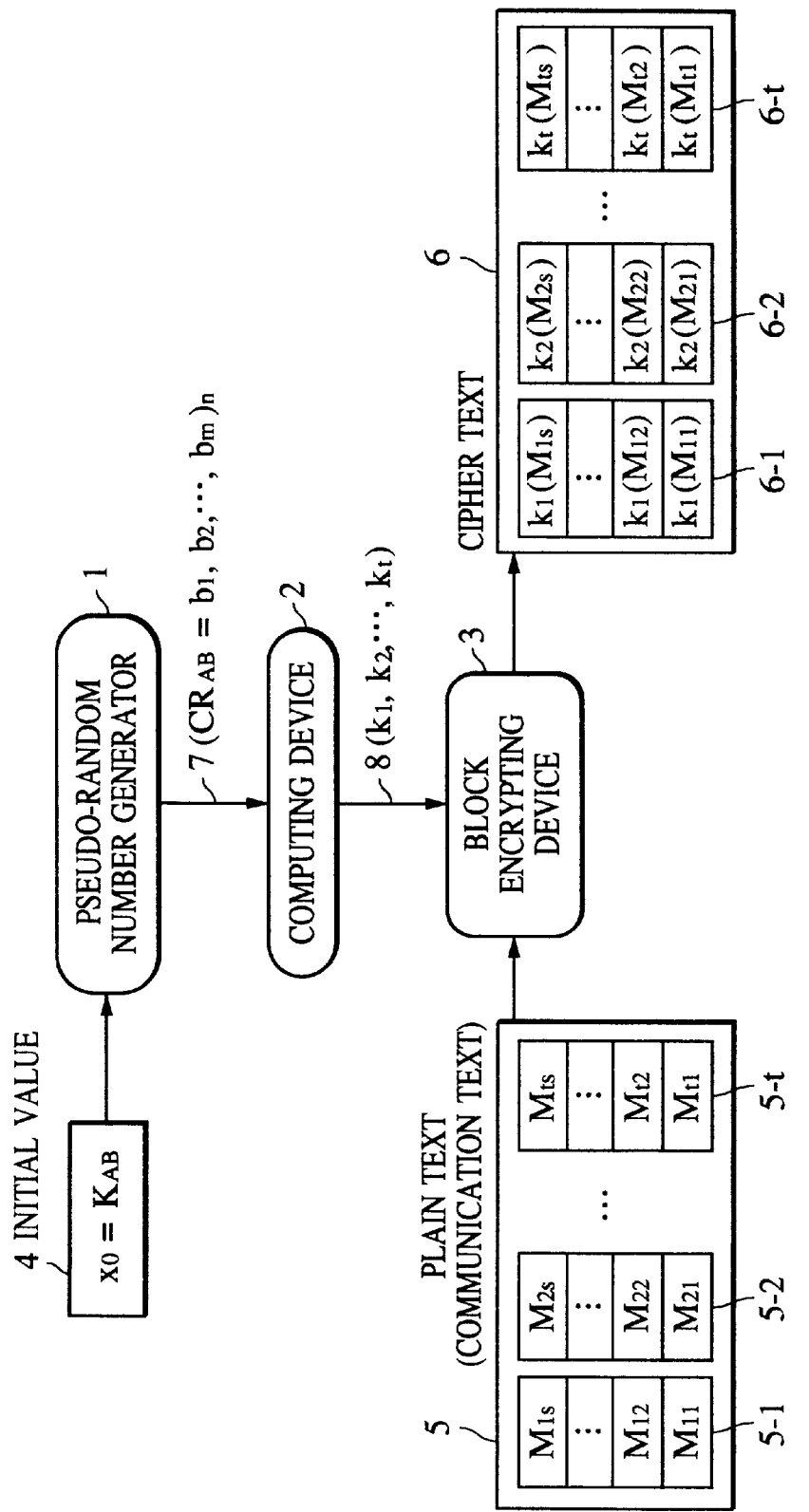
FIG. 22 is a diagram describing a known method by which a block cipher key is periodically updated with cryptographically secure pseudo-random numbers.

In the fifth embodiment, as is shown in FIG. 21, encrypted communication is performed using a communication terminal 22 comprising; a block encryption device 3 for performing encryption (deciphering) following an algorithm stipulated on the network; a pseudo-random number generator 11' for generating calculation-volume secure pseudo-random numbers following an algorithm stipulated on the network; a computing device 2 for converting the pseudo-random numbers output from the pseudo-random number generator 11' into a key stream for the block encryption device; a counter 14 for counting the number of times that feedback calculation has been obtained in the pseudo-random number generating device 11', a buffer 16 for holding "FB calculation times information" extracted from a portion of the received text, and a comparator 15 which compares the value of the buffer 16 with the value of the counter 14 and sends a control signal to the pseudo-random number generating device 11' in the event that there is a match.

The selector receives the communication initiation setting value and the initial setting value stored in the portable storage device 10', selects on based on the control signal from the comparator 15, and outputs to the pseudo-random number generator 11'.

Although described in detail below, in the fifth embodiment, feedback calculation of the Expression (3) based on the initial setting value is not always made whenever deciphering, as with the fourth embodiment. Rather, feedback calculation of the Expression (3) is enabled regarding the communication initiation setting value stored in the portable storage device 10', thereby reducing the number of times that feedback calculation of the Expression (3) has to be made. In this case, fewer processes are required for obtaining the communication initiation setting value at the time of deciphering, in the event that decryption of the cipher text is to be done in the order that the cipher texts were encrypted, or in the case of deciphering a cipher text which has been encrypted after the previously deciphered cipher text, making for effective deciphering. In other words, effective deciphering can be carried out in cases other than of deciphering cipher text in the order that the cipher text is deciphered. Also, only the deciphering procedures required for the above fourth embodiment are necessary in the case of deciphering cipher text in the reverse order to the encryption thereof.

The points in which the fifth embodiment differs from the fourth embodiment are in the deciphering process, so in the following description of communication procedures, only the deciphering procedures will be described. The encryption procedures are the same as those described in the fourth embodiment. Also, description will be made regarding encrypted communication from subscriber A to subscriber B, the same as with the fourth embodiment. Let us say that communication has already been performed between these subscribers several times, and that consequently the communication initiation setting value held in the holding area 10b of the portable storage device 10' of B is $x_k$, and that the "FB calculation times information" is "k". The initial setting value is fixed, and thus is $K_{AB}$. Description will be made regarding a case in which a cipher text sent from A with addition of "FB calculation times information m" is to be deciphered. The procedures of deciphering according to the fifth embodiment differ depending on the size relation of the FB calculation times information m" added to the cipher text and the FB calculation times information k" held in the holding area 10b of the portable storage device 10' of the receiver. Also, in the following description, it is assumed that the portable storage device 10' has verified the authorized user, and that the portable storage device 10' is in an operable state and is set so as to communicate with the inside of the communication terminal 22.

[Procedures for Reception of Cipher Text by the Receiver B]

(1) The sent cipher text and the "FB calculation times information m" corresponding to the cipher text are received, and the "FB calculation times information m" is stored in the buffer 16.

(2) The "FB calculation times information K" relating to the sender A held in the portable storage device 10' is set to the counter 14 of the communication terminal.

(3) The value m in the buffer 16 and the value k of the counter are compared in the comparator 15. If m minus k is positive, (4) is carried out, and if negative, (4)' is carried out.

(4) In the case of m>k, the selector 19 selects the communication initiation setting value $x_k$ held in the portable storage device 10' according to the control signal from the comparator 15, thereby setting $x_k$ to the pseudo-random number generator 11'. Next, feedback calculation of the Expression (3) is performed m−k times until the value of the counter 14 is equal to the value m. Whether the values are equal or not can be known by comparing the value of the counter 14 with the value of the buffer 16 using the comparator 15. Once the values are equal, the comparator 15 sends a control signal to the pseudo-random number generator 11', notifying such. The pseudo-random number generator 11' which has received the control signal is set with the internal variable $x_1$ as the communication initiation setting value after performing feedback calculation of the Expression (1) for m−k times. It should be noted, however, that the pseudo-random number sequence generated with this calculation is discarded.

(4)' In the case of m>k, the counter 14 is reset to "0" by a control signal from the comparator 15. Further, the selector 19 selects the communication initiation setting value $x_k$ held in the portable storage device 10' according to the control signal from the comparator 15, thereby setting $x_0$ to the pseudo-random number generator 11'. Next, feedback calculation of the Expression (3) is performed m times until the value of the counter 14 is equal to the value m. Whether the values are equal are not can be known by comparing the value of the counter 14 with the value of the buffer 16 using the comparator 15. Once the values are equal, the comparator 15 sends a control signal to the pseudo-random number generator 11', notifying such. The pseudo-random number generator 11' which has received the control signal is set with the internal variable $x_m$ as the communication initiation setting value after performing feedback calculation of the Expression (1) for m times. It-should be noted, however, that the pseudo-random number sequence generated with this calculation is discarded.

(4)" In the case of m=k, the selector 19 selects the communication initiation setting value $x_k$ held in the portable storage device 10' according to the control signal from the comparator 15, thereby setting $x_k$ ($=x_m$) to the pseudo-random number generator 11'.

(5) Next, the pseudo-random number generator 11' is operated to generate calculation-volume secure pseudo-random numbers.

(6) The pseudo-random number sequence generated by the computing device 2 is converted into a block cipher key stream.

(7) Using the key stream output from the computing device 2 as the block cipher key while continuously updating, the plain text is converted into cipher text by the block encrypting device 3. At the end of encryption, the counter 14 of the communication terminal 22 has been incremented to m+i.

(8) The internal variable value $x_{m+i}$ of the pseudo-random number generator 11' at the end of encryption is secretly held in the holding area 10b of the portable storage device 10' to be used as the new communication initiation setting value for subsequent communication with A.

(9) The value m+i of the counter 14 at the end of encryption is secretly held in the holding area 10b of the portable storage device 10' to be used as the new "FB calculation times information" for subsequent communication with A.

In the above deciphering procedures, (4) or (4)' is carried out in the event that the cipher text has not arrived in the order in which it was encrypted. This includes cases of the sender A sending the cipher text in an order other than the order in which encryption was performed, or the cipher text being sent in the order of encryption but the order thereof being changed in the communication path. This also includes cases of text being encrypted but not sent, or text which being sent which was encrypted at an earlier time.

(4)' is carried out in the event that text which was encrypted later is to be deciphered first, in which case the number of calculations of the Expression (3) necessary for obtaining the communication initiation setting value is the same as that of the second embodiment. Also, in the above deciphering procedures, (4)" is carried out in the event that the cipher text has arrived in the order in which it was encrypted. In this case, there is no need to perform calculations of the Expression (3) for obtaining the communication initiation setting value.

Accordingly, with the procedures shown with reference to the fifth embodiment, in the event that k≦m, the processing for obtaining the communication initiation setting value is reduced as compared to the deciphering procedures shown in the fourth embodiment, making for effective deciphering. However, situation conditioning such as shown in procedure (3) is necessary in this arrangement, as compared to the deciphering procedures shown with reference to the fourth embodiment, and further, a selector 19 which operates according to the situation conditions is necessary.

As described above, each of the encrypted communication network subscribers have portable storage devices such as shown in FIG. 16 or FIG. 18, perform encrypted communication using a communication terminal such as shown in FIG. 15, FIG. 19, or FIG. 6, and make reference to the "FB calculation times information" before deciphering, so cipher text can be deciphered in a random manner without necessitating troublesome procedures. The portable storage device is capable of exchanging with the communication terminal at least the "FB calculation times information" in the counter, and can store this in the above portable storage device for each party with which communication is made. Also, the portable storage device also holds the initial setting value for each party with which communication is made.

Also, in the above-described third through fifth embodiments, the computing device 12 of the first embodiment is employed instead of the computing device 2, thereby shortening the key updating cycle.

Also, in the above-described embodiments, although DES cipher was used as the block cipher, this is not limited to DES cipher; rather, any common key cipher can be used, such as FEAL cipher. Further, one DES encrypting device was used as the block encrypting device 3, but a plurality of DES encrypting devices or a combination of DES cipher and FEAL cipher may be used, instead.

Further, square-type pseudo-random numbers are described for the computationaly secure pseudo-random number generating algorithm, but any computationaly secure pseudo-random number generating algorithm may be used, so pseudo-random number generating algorithms using RSA ciphers, discreet logarithms, inverse number ciphers, etc., may be used.

Also, the number of bits of the modulo N of squaring calculation was described as being 512 bits, but any number of bits may be used as long as cryptographically secure.

Although the present invention has been describe in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A communication method for encrypting and transmitting a communication text, said communication method comprising the steps of:
   a sender sequentially generating pseudo-random numbers based on a common key secretly shared with a receiver;
   creating a new encryption key each time a newly created first certain amount of pseudo-random numbers are generated by removing the first certain amount of an oldest pseudo-random numbers from a previously-created second certain amount of pseudo-random numbers and adding the newly-created first certain amount of pseudo-random numbers, and updating the encryption-key; and
   encrypting and transmitting the communication text using the updated encryption key.

2. A communication method for receiving and deciphering an encrypted communication text, said communication method comprising the steps of:
   a receiver sequentially generating pseudo-random numbers based on a common key secretly shared with a sender;
   creating a new encryption key each time a newly-created first certain amount of pseudo-random numbers are generated by removing the first certain amount of an oldest pseudo-random numbers from a previously-created second certain amount of pseudo-random numbers and adding the newly-created first certain amount of pseudo-random numbers, and updating the encryption key; and
   deciphering the encrypted communication text using the updated encryption key.

3. A communication terminal device, comprising:
   transmitting means for encrypting and transmitting a communication text using an encryption key;
   means for a sender sequentially generating pseudo-random numbers based on a common key secretly shared with a receiver;
   means for creating a new encryption key each time a newly-created first certain amount of pseudo-random numbers are generated by said means for generating pseudo-random numbers by removing the newly-created first certain amount of an oldest pseudo-random numbers from a previously-created second certain amount of pseudo-random numbers and adding the newly-created first certain amount of pseudo-random numbers; and
   means for updating the encryption key used by said transmitting means each time a new encryption key is created by said means for creating a new encryption key.

4. A communication terminal device according to claim 3, wherein said means for creating a new encryption key further comprises a shift register which shifts an input of an output of said means for generating pseudo-random numbers.

5. A communication terminal device according to claim 3, wherein said means for creating a new encryption key further comprises an addressable register with output of said means for generating pseudo-random numbers as input thereof.

6. A communication terminal device according to claim 3, wherein said means for creating a new encryption key further comprises a plurality of ROMs with output of said means for generating pseudo-random numbers as input thereof, and computing means for performing a logical operation of an output of said plurality of ROMs.

7. A communication terminal device, comprising:
   receiving means for receiving and deciphering an encrypted communication text;
   means for a receiver sequentially generating pseudo-random numbers based on a common key secretly shared with a sender;
   means for creating a new encryption key each time a newly-created first certain amount of pseudo-random numbers are generated by said means for generating pseudo-random numbers by removing the newly-created first certain amount of an oldest pseudo-random numbers from a previously-created second certain amount of pseudo-random numbers and adding the newly-created first certain amount of pseudo-random numbers; and
   means for updating the encryption key used by said receiving means each time a new encryption key is created by said means for creating a new encryption key.

8. A communication terminal device according to claim 7, wherein said means for creating a new encryption key further comprises a shift register which shifts an input of an output of said means for generating pseudo-random numbers.

9. A communication terminal device according to claim 7, wherein said means for creating a new encryption key further comprises an addressable register with output of said means for generating pseudo-random numbers as input thereof.

10. A communication terminal device according to claim 7, wherein said means for creating a new encryption key further comprises a plurality of ROMs with output of said device for generating pseudo-random numbers as input thereof, and computing means for performing a logical operation of an output of said plurality of ROMs.

11. A communication method for encrypting and transmitting a communication text, said communication method comprising the steps of:
   a sender sequentially generating pseudo-random numbers based on sequentially updated internal variables with a common key secretly shared with a receiver as an initial value;
   updating an encryption key by generating a new encryption key each time a newly-created first certain amount of pseudo-random numbers are generated by removing the first certain amount of an oldest pseudo-random numbers from a previously-created second certain amount of pseudo-random numbers and adding the newly-created first certain amount of pseudo-random numbers;
   encrypting and sending the communication text using the updated encryption key; and
   storing the internal variables at an end of transmission as internal variables for subsequent communication with said receiver.

12. A communication method for receiving and deciphering an encrypted communication text, said communication method comprising the steps of:
   a receiver sequentially generating pseudo-random numbers based on sequentially updated internal variables with a common key secretly shared with a sender as an initial value;
   updating an encryption key by generating a new encryption key each time a newly-created first certain amount of pseudo-random numbers are generated by removing the first certain amount of an oldest pseudo-random numbers from a previously-created second certain amount of pseudo-random numbers and adding the newly-created first certain amount of pseudo-random numbers;
   deciphering the encrypted communication text using the updated encryption key; and
   storing the internal variables at an end of transmission as internal variables for subsequent communication with said sender.

13. A communication terminal device, comprising:
   transmitting means for encrypting and sending a communication text using an encryption key;
   means for a sender sequentially generating pseudo-random numbers based on sequentially updated internal variables with a common key secretly shared with a receiver as an initial value;
   means for creating a new encryption key each time a newly-created first certain amount of pseudo-random numbers are generated by said means for sequentially generating pseudo-random number by removing the first certain amount of an oldest pseudo-random numbers from a previously-created second certain amount of pseudo-random numbers and adding the newly-created first certain amount of pseudo-random numbers;
   means for updating the encryption key used by said transmitting means each time a new encryption key is created by said means for creating a new encryption key; and
   means for storing the internal variables, at an end of transmission by said transmitting means, as internal variables for subsequent communication with said receiver.

14. A communication terminal device, comprising:
   receiving means for receiving and deciphering an encrypted communication text using an encryption key;
   means for a receiver sequentially generating pseudo-random numbers based on sequentially updated internal variables with a common key secretly shared with a sender as an initial value;
   means for creating a new encryption key each time a first certain amount of pseudo-random numbers are generated by said means for sequentially generating pseudo-random numbers by removing the first certain amount of an oldest pseudo-random numbers from a previously-created second certain amount of pseudo-random numbers and adding the newly-created first certain amount of pseudo-random numbers;
   means for updating the encryption key used by said receiving means each time a new encryption key is created by said means for creating a new encryption key; and
   means for storing the internal variables, at an end of reception by said receiving means, as internal variables for subsequent communication with said sender.

15. A communication method for encrypting and transmitting a communication text, said communication method comprising the steps of:
   a transmitting terminal performing the steps of:
      sequentially generating pseudo-random numbers based on a common key secretly shared with a receiving terminal;
      counting a number of times pseudo-random numbers are generated;
      creating a new encryption key each time a first certain amount of pseudo-random numbers are generated by removing the first certain amount of an oldest pseudo-random numbers from a previously-created second certain amount of pseudo-random numbers and adding the newly-created first certain amount of pseudo-random numbers, and updating the encryption key;
      encrypting the communication text using the updated encryption key; and
      transmitting the encrypted communication text with a number of times pseudo-random numbers are generated prior to the encryption of the communication text; and
   a receiving terminal performing the steps of:
      receiving the encrypted communication text and the number of times the pseudo-random numbers are generated preceding the encryption of the communication text;
      sequentially generating pseudo-random numbers based on a common key secretly shared with the transmitting terminal and the number of times the pseudo-random numbers generated are received;
      creating a new encryption key after the number of times the pseudo-random numbers generated in the generating step of the receiving terminal equals the received number of times that the pseudo-random numbers are generated, the new encryption key being generated by removing a first certain amount of an oldest pseudo-random numbers from a previously-created second certain amount of pseudo-random numbers and adding the newly-created first certain amount of pseudo-random numbers, and updating the encryption key; and deciphering the encrypted communication text using the updated encryption key.

16. A communication network connecting a transmitting terminal and a receiving terminal, said communication network comprising:

a transmitting terminal, comprising:

means for encrypting a communication text using an encryption key;

first generating means for sequentially generating pseudo-random numbers based on a common key secretly shared with a receiving terminal;

counting means for counting a number of times pseudo-random numbers are generated by said first generating means;

first creating means for creating a new encryption key each time a first certain amount of pseudo-random numbers are generated by said first generating means by removing the first certain amount of an oldest pseudo-random numbers from a second certain amount of previously-created pseudo-random numbers and adding the first certain amount of pseudo-random numbers;

first updating means for updating the encryption key used by said encrypting means each time a new encryption key is created by said first creating means; and means for transmitting the communication text encrypted by said encrypting means, together with the number of times counted by said counting means preceding the encryption means encrypting the communication text; and a receiving terminal, comprising:

means for receiving the encrypted communication text and the number of times the pseudo-random numbers are counted by the counting means preceding the encryption of the communication text;

means for deciphering the encrypted communication text using an encryption key;

second generating means for sequentially generating pseudo-random numbers based on a common key secretly shared with the transmitting terminal and the number of times counted by the counting means received by the receiving means;

second creating means for creating a new encryption key after the number of times the pseudo-random numbers generated by said second generating means equals the received number of times counted by the counting means, the new encryption key being generated by removing a first certain amount of an oldest pseudo-random numbers from a previously-created second certain amount of pseudo-random numbers and adding the newly-created first certain amoun of pseudo-random numbers; and second updating means for updating the encryption key used by said receiving terminal each time a new encryption key is created by said second creating means.

17. A communication network according to claim 16, wherein said second generating means further comprises:

second counting means for counting a number of times pseudo-random numbers are generated by said second generating means;

count number storing means for storing the number of times counted by the counting means received by the receiving means; and means for judging whether or not the number of times counted by said second counting means is equal to the number of times stored by said count number storing means.

18. A communication network according to claim 16, wherein said transmitting terminal further comprises a recording medium for storing said number of times counted by said counting means, wherein said recording medium is removable from said transmitting terminal.

19. A communication network according to claim 18, wherein said recording medium further holds a value of an internal variable of said first generating means, and further comprises means for setting a value of an internal variable stored within said recording medium by said first generating means.

* * * * *

UNITED STATES PATENT AND TRADEMARK OFFICE
CERTIFICATE OF CORRECTION

PATENT NO. : 6,307,940 B1
DATED : October 23, 2001
INVENTOR(S) : Yamamoto et al.

It is certified that error appears in the above-identified patent and that said Letters Patent is hereby corrected as shown below:

Column 1,
Line 25, "data" should read -- Data --.

Column 4,
Line 32, "comprising;" should read -- comprising: --.

Column 6,
Line 5, "key:" should read -- key; --; and
Line 18, "text:" should read -- text; --.

Column 7,
Line 24, "terminal;" should read -- terminal, --; and
Line 34, "minal;" should read -- minal, --.

Column 11,
Line 21, "generates" should read -- it generates --.

Column 12,
Line 3, "18)" should read -- 18). --;
Line 13, "18.(4) With" should begin a new paragraph at -- (4) With --;
Line 17, "obtained;" should read -- obtained: --; and
Line 67, "comprising;" should read -- comprising: --.

Column 13,
Line 41, "as the" should be deleted; and
Line 65, "as the" should be deleted.

Column 15,
Line 12, "example" should read -- Example --; and
Line 14, "example" should read -- Example --.

UNITED STATES PATENT AND TRADEMARK OFFICE
CERTIFICATE OF CORRECTION

PATENT NO. : 6,307,940 B1
DATED : October 23, 2001
INVENTOR(S) : Yamamoto et al.

It is certified that error appears in the above-identified patent and that said Letters Patent is hereby corrected as shown below:

Column 16,
Line 62, "comprising;" should read -- comprising: --.

Column 18,
Line 58, "," should read -- ), --.

Column 19,
Line 59, "k,." should read -- $k_u$. --.

Column 23,
Line 34, "comprising;" should read -- comprising: --.

Column 24,
Line 33, "uses" should read -- used --.

Column 27,
Line 40, "computationaly" should read -- computationally --.

Column 28,
Line 9, "comprising;" should read -- comprising: --.

Column 30,
Line 32, "comprising;" should read -- comprising: --; and
Line 50, "on" (first occurrence) should be deleted.

Column 31,
Line 23, after "deciphered." should begin a new paragraph.

UNITED STATES PATENT AND TRADEMARK OFFICE
CERTIFICATE OF CORRECTION

PATENT NO.  : 6,307,940 B1
DATED       : October 23, 2001
INVENTOR(S) : Yamamoto et al.

It is certified that error appears in the above-identified patent and that said Letters Patent is hereby corrected as shown below:

<u>Column 32,</u>
Line 11, "It-should" should read -- It should --.

<u>Column 38,</u>
Line 14, "amoun" should read -- amount --.

Signed and Sealed this

Fourteenth Day of January, 2003

JAMES E. ROGAN
*Director of the United States Patent and Trademark Office*